United States Patent
Jia et al.

(10) Patent No.: US 10,290,111 B2
(45) Date of Patent: May 14, 2019

(54) SYSTEMS AND METHODS FOR COMPOSITING IMAGES

(71) Applicant: QUALCOMM Incorporated, San Diego, CA (US)

(72) Inventors: Chao Jia, San Diego, CA (US); Ramin Rezaiifar, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 100 days.

(21) Appl. No.: 15/413,225

(22) Filed: Jan. 23, 2017

(65) Prior Publication Data

US 2018/0033155 A1  Feb. 1, 2018

Related U.S. Application Data

(60) Provisional application No. 62/367,016, filed on Jul. 26, 2016.

(51) Int. Cl.
*G06K 9/32* (2006.01)
*G06T 7/33* (2017.01)
(Continued)

(52) U.S. Cl.
CPC ............ *G06T 7/337* (2017.01); *G06T 3/0012* (2013.01); *G06T 3/0068* (2013.01);
(Continued)

(58) Field of Classification Search
None
See application file for complete search history.

(56) References Cited

U.S. PATENT DOCUMENTS

| | | |
|---|---|---|
| 7,009,638 B2 | 3/2006 | Gruber et al. |
| 7,305,180 B2 | 12/2007 | Labaziewicz et al. |

(Continued)

FOREIGN PATENT DOCUMENTS

WO    2009097552 A1    8/2009

OTHER PUBLICATIONS

Zitova B., et al., "Image registration methods: a survey," Image and Vision Computing, Oct. 2003, vol. 21, No. 11, pp. 977-1000.

(Continued)

*Primary Examiner* — Kevin Ky
(74) *Attorney, Agent, or Firm* — Austin Rapp; QUALCOMM Incorporated

(57) ABSTRACT

A method for compositing images by an electronic device is described. The method includes obtaining a first composite image that is based on a first image from a first lens with a first focal length and a second image from a second lens with a different second focal length. The method also includes downsampling the first composite image to produce a downsampled first composite image. The method further includes downsampling the first image to produce a downsampled first image. The method additionally includes producing a reduced detail blended image based on the downsampled first composite image and the downsampled first image. The method also includes producing an upsampled image based on the reduced detail blended image and the downsampled first composite image. The method further includes adding detail from the first composite image to the upsampled image to produce a second composite image.

26 Claims, 18 Drawing Sheets

(51) Int. Cl.
  *G06T 7/13* (2017.01)
  *G06T 3/00* (2006.01)
  *G06T 5/50* (2006.01)
  *H04N 5/225* (2006.01)
  *H04N 5/265* (2006.01)
  *H04N 5/232* (2006.01)

(52) U.S. Cl.
  CPC .............. *G06T 3/0093* (2013.01); *G06T 5/50* (2013.01); *G06T 7/13* (2017.01); *G06T 7/33* (2017.01); *G06T 7/344* (2017.01); *H04N 5/2258* (2013.01); *H04N 5/23235* (2013.01); *H04N 5/265* (2013.01); *G06T 2207/10148* (2013.01); *G06T 2207/20012* (2013.01); *G06T 2207/20021* (2013.01); *G06T 2207/20221* (2013.01); *G06T 2207/30232* (2013.01); *G06T 2207/30252* (2013.01)

(56) References Cited

U.S. PATENT DOCUMENTS

| | | | |
|---|---|---|---|
| 7,346,217 B1 | 3/2008 | Gold, Jr. | |
| 7,961,983 B2* | 6/2011 | Uyttendaele | G06T 3/4038 382/154 |
| 8,189,959 B2* | 5/2012 | Szeliski | G06T 3/4038 382/284 |
| 8,526,779 B2 | 9/2013 | Simmons et al. | |
| 9,185,291 B1 | 11/2015 | Shabtay et al. | |
| 9,241,111 B1* | 1/2016 | Baldwin | G03B 35/08 |
| 2002/0191083 A1 | 12/2002 | Akiyoshi et al. | |
| 2006/0249581 A1* | 11/2006 | Smith | G06K 7/14 235/454 |
| 2007/0237420 A1* | 10/2007 | Steedly | G06K 9/32 382/284 |
| 2008/0143744 A1 | 6/2008 | Agarwala | |
| 2008/0218613 A1 | 9/2008 | Janson et al. | |
| 2008/0310501 A1* | 12/2008 | Ward | G06T 5/009 375/240.02 |
| 2010/0014755 A1 | 1/2010 | Wilson | |
| 2010/0054628 A1 | 3/2010 | Levy et al. | |
| 2010/0177955 A1* | 7/2010 | Simakov | G06F 17/30843 382/154 |
| 2011/0110601 A1* | 5/2011 | Hong | G06T 5/20 382/255 |
| 2011/0115934 A1* | 5/2011 | Wang | G06T 3/4076 348/222.1 |
| 2011/0280457 A1* | 11/2011 | Nielsen | G06T 7/0012 382/131 |
| 2011/0285963 A1* | 11/2011 | Kurtz | G02B 27/18 353/8 |
| 2012/0008021 A1* | 1/2012 | Zhang | G06K 9/00791 348/251 |
| 2012/0026366 A1 | 2/2012 | Golan et al. | |
| 2012/0027281 A1* | 2/2012 | Jang | G06T 11/006 382/131 |
| 2012/0062691 A1 | 3/2012 | Fowler et al. | |
| 2012/0075489 A1 | 3/2012 | Nishihara | |
| 2012/0121204 A1* | 5/2012 | Ding | G06T 3/0012 382/260 |
| 2014/0348425 A1* | 11/2014 | Tian | G06T 3/0093 382/167 |
| 2015/0085174 A1 | 3/2015 | Shabtay et al. | |
| 2015/0131924 A1 | 5/2015 | He et al. | |
| 2015/0207999 A1 | 7/2015 | Han et al. | |
| 2016/0104301 A1* | 4/2016 | Liu | G06T 11/001 382/162 |
| 2017/0287184 A1* | 10/2017 | Pettersson | G06T 11/60 |

OTHER PUBLICATIONS

International Search Report and Written Opinion—PCT/US2017/036191—ISA/EPO—dated Sep. 7, 2017.
Perez, P., et al., "Poisson Image Editing," SIGGRAPH '03 ACM, SIGGRAPH 2003 Papers, pp. 313-318.
Perez P., et al., "Poisson Image Editing," SIGGRAPH '03 ACM, SIGGRAPH 2003 Papers, vol. 22, No. 3, Jul. 1, 2003 (Jul. 1, 2003), XP058249525, pp. 313-318.

* cited by examiner

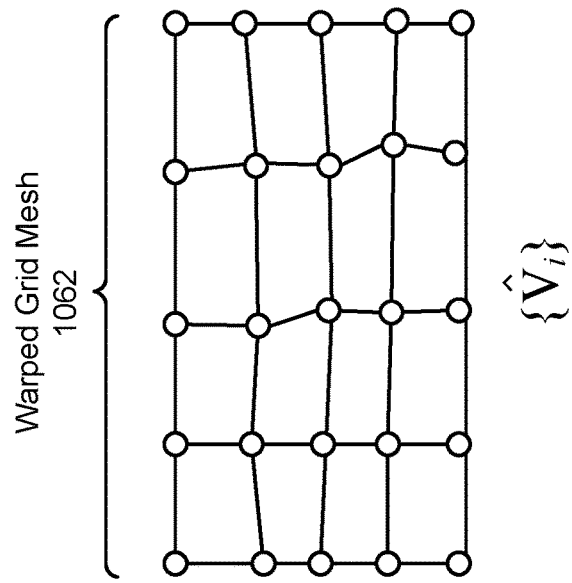
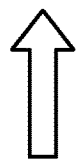
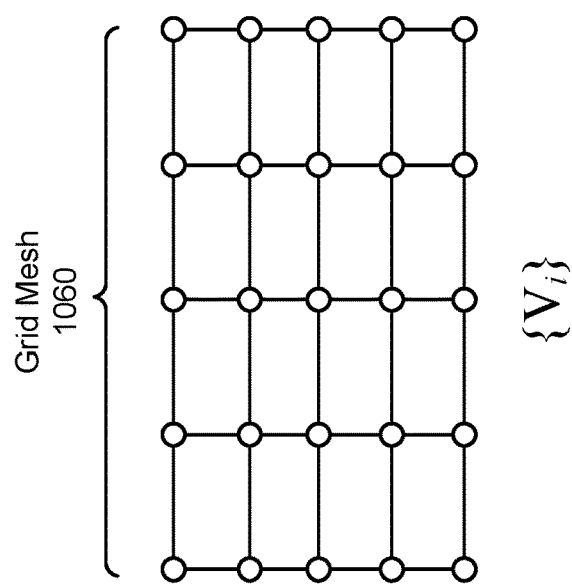
FIG. 10

SYSTEMS AND METHODS FOR COMPOSITING IMAGES

RELATED APPLICATION

This application is related to and claims priority to U.S. Provisional Patent Application Ser. No. 62/367,016, filed Jul. 26, 2016, for "SYSTEMS AND METHODS FOR COMPOSITING WIDE-ANGLE AND TELEPHOTO IMAGES."

FIELD OF DISCLOSURE

The present disclosure relates generally to electronic devices. More specifically, the present disclosure relates to systems and methods for compositing images.

BACKGROUND

Some electronic devices (e.g., cameras, video camcorders, digital cameras, cellular phones, smart phones, computers, televisions, automobiles, personal cameras, action cameras, surveillance cameras, mounted cameras, connected cameras, robots, drones, smart applications, healthcare equipment, set-top boxes, etc.) capture and/or utilize images. For example, a smartphone may capture and/or process still and/or video images. Processing images may demand a relatively large amount of time, memory, and energy resources. The resources demanded may vary in accordance with the complexity of the processing.

Some kinds of images may be limited in detail, while some kinds of images may be limited in view. As can be observed from this discussion, systems and methods that improve image processing may be beneficial.

SUMMARY

A method for compositing images by an electronic device is described. The method includes obtaining a first composite image that is based on a first image from a first lens with a first focal length and a second image from a second lens with a different second focal length. The method also includes downsampling the first composite image to produce a downsampled first composite image. The method further includes downsampling the first image to produce a downsampled first image. The method additionally includes producing a reduced detail blended image based on the downsampled first composite image and the downsampled first image. The method also includes producing an upsampled image based on the reduced detail blended image and the downsampled first composite image. The method further includes adding detail from the first composite image to the upsampled image to produce a second composite image. Producing the reduced detail blended image may include Poisson editing for color and intensity matching.

The method may include determining a difference between the reduced detail blended image and the downsampled first composite image to produce a difference image. The upsampled image may be an upsampled difference image produced by upsampling the difference image.

The method may include performing grid-based image alignment based on the first image and the second image to produce a warped second image. Performing grid-based image alignment may include minimizing re-projection errors of matched point features and matched line segment features while preserving rigidity.

The method may include performing point feature matching based on the first image and the second image. The method may also include performing line segment feature matching based on the first image and the second image.

The method may include determining at least one first image line segment feature and at least one second image line segment feature. The method may also include aligning the second image and the first image by matching the at least one second image line segment feature and the at least one first image line segment feature.

The method may include determining a seam based on the first image and the second image. Determining the seam may be based on a bias term that favors selecting second image data. The method may also include compositing the first image and a warped second image based on the seam to produce the first composite image.

An electronic device for compositing images is also described. The electronic device includes a memory and a processor coupled to the memory. The processor is configured to obtain a first composite image that is based on a first image from a first lens with a first focal length and a second image from a second lens with a different second focal length. The processor is also configured to downsample the first composite image to produce a downsampled first composite image. The processor is further configured to downsample the first image to produce a downsampled first image. The processor is additionally configured to produce a reduced detail blended image based on the downsampled first composite image and the downsampled first image. The processor is also configured to produce an upsampled image based on the reduced detail blended image and the downsampled first composite image. The processor is further configured to add detail from the first composite image to the upsampled image to produce a second composite image.

A computer-program product for compositing images is also described. The computer-program product includes a non-transitory tangible computer-readable medium with instructions. The instructions include code for causing an electronic device to obtain a first composite image that is based on a first image from a first lens with a first focal length and a second image from a second lens with a different second focal length. The instructions also include code for causing the electronic device to downsample the first composite image to produce a downsampled first composite image. The instructions further include code for causing the electronic device to downsample the first image to produce a downsampled first image. The instructions additionally include code for causing the electronic device to produce a reduced detail blended image based on the downsampled first composite image and the downsampled first image. The instructions also include code for causing the electronic device to produce an upsampled image based on the reduced detail blended image and the downsampled first composite image. The instructions further include code for causing the electronic device to add detail from the first composite image to the upsampled image to produce a second composite image.

An apparatus for compositing images is also described. The apparatus includes means for obtaining a first composite image that is based on a first image from a first lens with a first focal length and a second image from a second lens with a different second focal length. The apparatus also includes means for downsampling the first composite image to produce a downsampled first composite image. The apparatus further includes means for downsampling the first image to produce a downsampled first image. The apparatus additionally includes means for producing a reduced detail blended image based on the downsampled first composite image and the downsampled first image. The apparatus also includes means for producing an upsampled image based on the reduced detail blended image and the downsampled first composite image. The apparatus further includes means for adding detail from the first composite image to the upsampled image to produce a second composite image.

BRIEF DESCRIPTION OF THE DRAWINGS

FIG. 10 is a diagram illustrating an example of grid-based image alignment;

DETAILED DESCRIPTION

Figure 1:
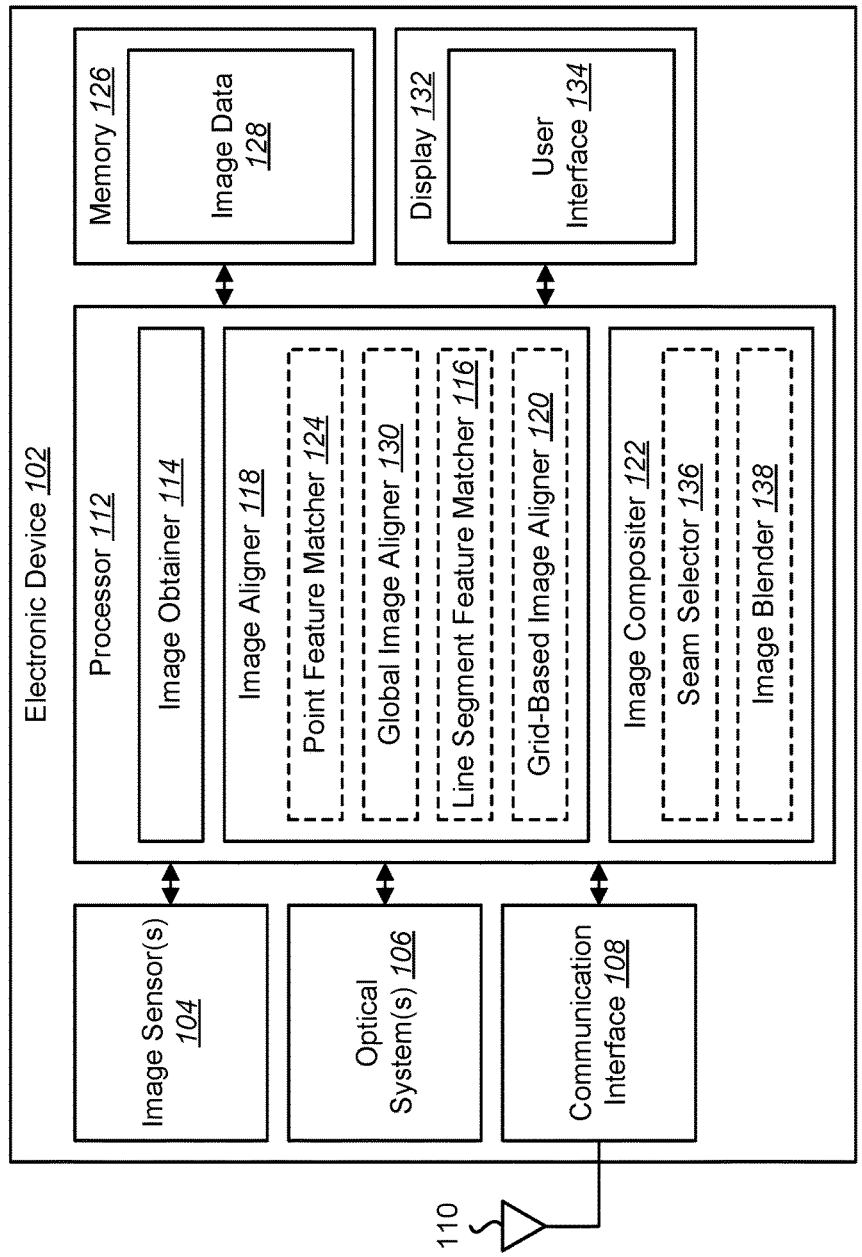
FIG. 1 is a block diagram illustrating one example of an electronic device in which systems and methods for aligning images and/or systems and methods for compositing images may be implemented.

The systems and methods disclosed herein may relate to compositing (e.g., fusing) images from different lenses. For example, some configurations of the systems and methods disclosed herein may enable fusing an image pair captured from lenses with different focal lengths (e.g., a wide-angle lens and a telephoto lens). The systems and methods disclosed herein may be implemented in a variety of electronic devices.

Due to size limitations, camera lenses on smartphones may not have optical zoom capability. Digital zoom may not provide image quality as high as optical zoom. Dual-camera settings may be utilized on smartphones to increase image quality under low light conditions and/or to provide three-dimensional (3D) information of the scene.

If the smartphone is equipped with a wide-angle camera and a telephoto camera, then the telephoto camera may be used for optical "zoom" (relative to the wide-angle camera, for example) to provide more details and less noise than digital zoom. Some arrangements of wide and telephoto cameras may only allow switching between using a wide-angle camera or telephoto camera and may only capture an image with one camera at a time.

In some configurations, the systems and methods disclosed herein may provide an algorithm that composites (e.g., fuses) an image pair captured concurrently or simultaneously from multiple lenses (e.g., lenses with different focal lengths, a wide-angle camera and a telephoto camera, etc.) to generate a single image that takes advantage of multiple cameras (e.g., both cameras). For example, the fused image may have the same view angle as the wide-angle camera so more image content is captured. Furthermore, the fused image may have more detail and less noise from the telephoto camera image in the co-visible region of the two cameras.

It should be noted that some configurations, approaches, and/or implementations of the systems and methods disclosed herein may be described in "wide-angle" and "telephoto" terms. While some configurations may be implemented with wide-angle and telephoto lenses, cameras, and/or images, some configurations of the systems and methods disclosed herein may be implemented more generally with two or more lenses, cameras, and/or images. For example, a first lens may produce a first image and a second lens may produce a second image. A first lens (e.g., camera) may have a same focal length as, or a different focal length (e.g., larger or smaller) than, a second lens (e.g., camera). In other configurations, two or more lenses with a same focal length may be utilized. Accordingly, each of the configurations, approaches, and/or implementations described in "wide-angle" and "telephoto" terms herein also disclose similar more general configurations. For example, a configuration described in "wide-angle" and "telephoto" terms may be read as an example of more general "first" and "second" terms. For instance, a more general "first image" may be utilized instead of a "wide-angle image" and a more general "second image" may be utilized instead of a "telephoto image." Additionally or alternatively, a more general "first lens" or "first camera" may be implemented or utilized instead of a "wide-angle lens" or "wide-angle camera" and/or a more general "second lens" or "second camera" may be implemented or utilized instead of a "telephoto lens" or "telephoto camera." Different lenses may have different viewpoints and/or view angles.

In order to composite (e.g., fuse) the two images captured by the wide-angle camera and the telephoto camera, the two images may first be aligned using a grid-based model (e.g., disparity model, motion model, etc.) in some approaches. The grid-based model may define a grid mesh (e.g., a uniform grid mesh) on the reference image and may assume that each grid cell undergoes a different transformation (e.g., bilinear transformation) from the reference image to the other image. The model may be parameterized by the coordinates of all corresponding grid vertices in the other image. The model may be more flexible than a global image transformation model, such as an affine transform or homography transform. This flexibility may be useful (e.g., beneficial, important, etc.) in handling parallax between the two images caused by the difference in mounting positions of the two cameras. The estimation of the model (e.g., disparity model, motion model, etc.) may rely on point feature (e.g., Shi-Tomasi corner, oriented FAST (features from accelerated segment test) and rotated BRIEF (binary robust independent elementary feature) (ORB), binary robust invariant scalable keypoint (BRISK), etc.) matching between the two images in some approaches.

In some configurations, line segment feature matching (e.g., line segment detector (LSD) and line band descriptor (LBD)) may be utilized to further assist in estimating the model (e.g., disparity model, motion model, etc.). The matched line segment features may be useful to align images in low-texture regions where there may be too few point features that can be detected. Moreover, matched line segment features may help to maintain straight lines after warping.

In some configurations, the coordinates of all warped grid vertices may be computed by minimizing an objective function including three terms. The first term may be the re-projection error of the point features. Each re-projected point feature may be represented by four warped vertices of its enclosing grid cell using bilinear interpolation, for example. The second term may be a measure of the re-projection error of the line segment features. Several points may be sampled on each line segment feature in the reference image. The distance between these points after warping and the matched line segment in the other image may be used to measure the re-projection error of line segments. Similar to the point features in some configurations, each sampled point on the line segment features may also be represented by the four warped vertices of its enclosing grid cell using bilinear interpolation. The third term may be a shape-preserving term to guarantee the transformation of each grid cell to be close to a similarity transformation, which may be useful (e.g., beneficial, important, etc.) to prevent the model (e.g., disparity model, motion model, etc.) from being too flexible. The formulated objective function is quadratic and may be solved by a sparse linear system solver (e.g., lower upper (LU) factorization, conjugate gradient descent, etc.).

After the transformation between two images is estimated, the telephoto image may be warped to the view of wide-angle camera image to cover the co-visible region. Because image alignment may not be perfect, there may still be structural mismatch along the boundary of the warped telephoto image. A composition boundary (e.g., a new optimal composition boundary) may be selected via graph optimization such that the image content is consistent along the boundary. After this step, the structural mismatch along the boundary may be effectively removed.

There may still be inconsistency in intensity and/or color on different sides of the composition boundary. This may be due to the wide and telephoto cameras having different exposure and/or color balance settings while they are capturing images. Additionally or alternatively, a potential difference in lens and/or complementary-metal-oxide-semiconductor (CMOS) sensor may also exhibit a difference in the radiometric responses between the two cameras. This problem may be ameliorated and/or solved by blending the warped telephoto image with the wide-angle image in a gradient domain. For example, the boundary values of the warped telephoto image may be enforced to be the same as the wide-angle image. A color-corrected warped telephoto image may be obtained by preserving the color gradient. This may be achieved by solving a Poisson equation in some approaches. With color correction, any visible inconsistency may be successfully removed along the composition boundary so that the final composite (e.g., fused) image is free of artifacts.

Gradient-domain image blending may be computationally intensive (e.g., time-consuming), because it may involve solving a Poisson equation at a very large scale. It may be observed that the difference between the original warped telephoto image and the color corrected image may vary slowly in spatial domain. Therefore, such gradient-domain image blending on may be applied on downsampled images and the upsampled difference may be added back to the full-resolution image. This approach may be equivalently effective in compensating the color difference and/or may be performed more efficiently (e.g., run faster).

One advantage of some configurations of the systems and methods disclosed herein is that an image pair captured from a wide-angle camera and a telephoto camera may be seamlessly composited (e.g., fused). For example, the wide-angle image and the telephoto image may be composited without a visible seam. The composited (e.g., fused) image may have the same view angle as the wide-angle camera so more image content is captured in some approaches. The composited image may have more detail and less noise (as provided by the telephoto camera image, for example) in the co-visible region of the two cameras.

Various configurations are now described with reference to the Figures, where like reference numbers may indicate functionally similar elements. The systems and methods as generally described and illustrated in the Figures herein could be arranged and designed in a wide variety of different configurations. Thus, the following more detailed description of several configurations, as represented in the Figures, is not intended to limit scope, as claimed, but is merely representative of the systems and methods.

FIG. 1 is a block diagram illustrating one example of an electronic device 102 in which systems and methods for aligning images and/or systems and methods for compositing images may be implemented. Examples of the electronic device 102 include cameras, video camcorders, digital cameras, cellular phones, smart phones, computers (e.g., desktop computers, laptop computers, etc.), tablet devices, media players, televisions, automobiles, personal cameras, action cameras, surveillance cameras, mounted cameras, connected cameras, robots, aircraft, drones, unmanned aerial vehicles (UAVs), healthcare equipment, gaming consoles, personal digital assistants (PDAs), set-top boxes, etc. The electronic device 102 may include one or more components or elements. One or more of the components or elements may be implemented in hardware (e.g., circuitry) or a combination of hardware and software (e.g., a processor with instructions) and/or of hardware and firmware.

In some configurations, the electronic device 102 may include a processor 112, a memory 126, a display 132, one or more image sensors 104, one or more optical systems 106, and/or a communication interface 108. The processor 112 may be coupled to (e.g., in electronic communication with) the memory 126, display 132, image sensor(s) 104, optical system(s) 106, and/or communication interface 108. It should be noted that one or more of the elements illustrated in FIG. 1 may be optional. In particular, the electronic device 102 may not include one or more of the elements illustrated in FIG. 1 in some configurations. For example, the electronic device 102 may or may not include an image sensor 104 and/or optical system 106. Additionally or alternatively, the electronic device 102 may or may not include a display 132. Additionally or alternatively, the electronic device 102 may or may not include a communication interface 108.

In some configurations, the electronic device 102 may present a user interface 134 on the display 132. For example, the user interface 134 may enable a user to interact with the electronic device 102. In some configurations, the display 132 may be a touchscreen that receives input from physical touch (by a finger, stylus, or other tool, for example). Additionally or alternatively, the electronic device 102 may include or be coupled to another input interface. For example, the electronic device 102 may include a camera facing a user and may detect user gestures (e.g., hand gestures, arm gestures, eye tracking, eyelid blink, etc.). In another example, the electronic device 102 may be coupled to a mouse and may detect a mouse click. In some configurations, one or more of the images described herein (e.g., wide-angle images, telephoto images, composited images, etc.) may be presented on the display 132 and/or user interface 134.

The communication interface 108 may enable the electronic device 102 to communicate with one or more other electronic devices. For example, the communication interface 108 may provide an interface for wired and/or wireless communications. In some configurations, the communication interface 108 may be coupled to one or more antennas 110 for transmitting and/or receiving radio frequency (RF) signals. Additionally or alternatively, the communication interface 108 may enable one or more kinds of wireline (e.g., Universal Serial Bus (USB), Ethernet, etc.) communication.

In some configurations, multiple communication interfaces 108 may be implemented and/or utilized. For example, one communication interface 108 may be a cellular (e.g., 3G, Long Term Evolution (LTE), CDMA, etc.) communication interface 108, another communication interface 108 may be an Ethernet interface, another communication interface 108 may be a universal serial bus (USB) interface, and yet another communication interface 108 may be a wireless local area network (WLAN) interface (e.g., Institute of Electrical and Electronics Engineers (IEEE) 802.11 interface).

The electronic device 102 (e.g., image obtainer 114) may obtain one or more images (e.g., digital images, image frames, frames, video, wide-angle images, telephoto images, etc.). The one or more images (e.g., frames) may be images of a scene (e.g., one or more objects and/or background). For example, the electronic device 102 may include one or more image sensors 104 and one or more optical systems 106 (e.g., lenses). An optical system 106 may focus images of objects that are located within the field of view of the optical system 106 onto an image sensor 104. The optical system(s) 106 may be coupled to and/or controlled by the processor 112 in some configurations.

A camera may include at least one image sensor and at least one optical system. Accordingly, the electronic device 102 may be one or more cameras and/or may include one or more cameras in some implementations. In some configurations, the image sensor(s) 104 may capture the one or more images (e.g., image frames, video, still images, burst mode images, stereoscopic images, wide-angle images, telephoto images, etc.). In some configurations, the image sensor(s) 104 may capture the one or more images. In some implementations, the electronic device 102 may include multiple optical system(s) 106 and/or multiple image sensors 104. For example, the electronic device 102 may include two lenses (e.g., a wide-angle lens and a telephoto lens) in some configurations. The lenses may have the same focal length or different focal lengths. The lenses (e.g., wide-angle lens and telephoto lens) may each be paired with separate image sensors 104 in some configurations. Alternatively, the lenses may share the same image sensor 104.

Additionally or alternatively, the electronic device 102 may request and/or receive the one or more images from another device (e.g., one or more external image sensors coupled to the electronic device 102, a network server, traffic camera, drop camera, automobile camera, web camera, smartphone camera, etc.). In some configurations, the electronic device 102 may request and/or receive the one or more images via the communication interface 108. For example, the electronic device 102 may or may not include a camera (e.g., an image sensor 104 and/or optical system 106) and may receive images (e.g., a wide-angle image and a telephoto image) from one or more remote devices.

The memory 126 may store instructions and/or data. The processor 112 may access (e.g., read from and/or write to) the memory 126. Examples of instructions and/or data that may be stored by the memory 126 may include image data 128 (e.g., wide-angle image data, telephoto image data, etc.), features, feature vectors, keypoint data, corner data, line segment data, transform data, seam data, reduced detail (e.g., downsampled) image data, image obtainer 114 instructions, image aligner 118 instructions, line segment feature matcher 116 instructions, grid-based image aligner 120 instructions, image compositer 122 instructions, and/or instructions for other elements, etc.

In some configurations, the electronic device 102 (e.g., the memory 126) may include an image data buffer (not shown). The image data buffer may buffer (e.g., store) image data (e.g., image frame(s)) from the image sensor 104. The buffered image data may be provided to the processor 112.

In some configurations, the electronic device 102 may include a camera software application and/or a display 132. When the camera application is running, images of scenes and/or objects that are located within the field of view of the optical system(s) 106 may be captured by the image sensor(s) 104. The images that are being captured by the image sensor(s) 104 may be presented on the display 132. In some configurations, these images may be displayed in rapid succession at a relatively high frame rate so that, at any given moment in time, the objects that are located within the field of view of the optical system 106 are presented on the display 132. The one or more images (e.g., wide-angle images, telephoto images, etc.) obtained by the electronic device 102 may be one or more video frames and/or one or more still images. It should be noted that the systems and methods disclosed herein may be applied to a pair of images and/or to two series of images (e.g., wide-angle video and telephoto video).

The processor 112 may include and/or implement an image obtainer 114, an image aligner 118, and/or an image compositer 122. In some configurations, the image aligner 118 may include a point feature matcher 124, a global image aligner 130, a line segment feature matcher 116, and/or a grid-based image aligner 120. In some configurations, the image compositer 122 may include a seam selector 136 and/or an image blender 138. It should be noted that one or more of the elements illustrated in the electronic device 102 and/or processor 112 may be optional. For example, the image aligner 118, the point feature matcher 124, the global image aligner 130, the line segment feature matcher 116, the grid-based image aligner 120, the image compositer 122, the seam selector 136, and/or the image blender 138 may or may not be included and/or implemented. Additionally or alternatively, one or more of the elements illustrated in the processor 112 may be implemented separately from the processor 112 (e.g., in other circuitry, on another processor, on a separate electronic device, etc.).

The processor 112 may include and/or implement an image obtainer 114. One or more images (e.g., image frames, video, burst shots, etc.) may be provided to the image obtainer 114. For example, the image obtainer 114 may obtain image frames from one or more image sensors 104. For instance, the image obtainer 114 may receive image data from one or more image sensors 104 and/or from one or more external cameras. As described above, the image(s) may be captured from the image sensor(s) 104 included in the electronic device 102 or may be captured from one or more remote camera(s). In some configurations, the image obtainer 114 may obtain a wide-angle image and/or may obtain a telephoto image.

In some configurations, a wide-angle image may be captured with a wide-angle lens. A telephoto image may be captured with a telephoto lens. A wide-angle lens may have a shorter focal length and a wider field of view (FOV) (e.g., a greater angular range) than the telephoto lens. For example, the telephoto lens may have a narrower FOV (e.g., a lesser angular range) than the wide-angle lens. The telephoto lens may enable capturing greater detail and/or magnified images in comparison with the wide-angle lens. For example, a wide-angle lens may have an equal or a shorter focal length and/or may provide an equal or a larger field of view than a "normal" lens. Additionally or alternatively, a telephoto lens may have an equal or a longer focal length, may provide equal or greater magnification, and/or may provide an equal or a smaller field of view than a "normal" lens. In one example, a 28 millimeter (mm) lens relative to a full-frame image sensor may be considered a "normal" lens. For instance, a lens with a 28 mm focal length may be utilized in smartphone cameras. Lenses with focal lengths equal to or shorter than a normal lens (e.g., 28 mm) (relative to a full-frame sensor, for example) may be considered "wide-angle" lenses, while lenses with focal lengths equal to or longer than a normal lens (e.g., 28 mm) may be considered "telephoto" lenses. In other examples, other lens focal lengths (e.g., 50 mm) may be considered "normal" lenses. It should be noted that the systems and methods disclosed herein may be implemented with multiple lenses of equal or different focal lengths. Configurations described herein with reference to a wide-angle lens and a telephoto lens may be additionally or alternatively implemented with multiple (e.g., a pair of) lenses with equal or different focal lengths and/or lenses of the same or different types (e.g., multiple wide-angle lenses, multiple telephoto lenses, a wide-angle lens and a telephoto lens, multiple normal lenses, a normal lens and a wide-angle lens, a normal lens and a telephoto lens, etc.).

In some configurations, the image obtainer 114 may request and/or receive one or more images (e.g., a first image, a second image, image frames, wide-angle images, telephoto images, etc.). For example, the image obtainer 114 may request and/or receive one or more images from a remote device (e.g., external camera(s), remote server, remote electronic device, etc.) via the communication interface 108.

The processor 112 may include and/or implement an image aligner 118. The image aligner 118 may substantially align (e.g., match the viewpoints of) at least two images. In some configurations, the image aligner 118 may register, rectify, align, and/or warp one or more images. For example, image aligning may include spatially aligning the images such that the images appear to be taken from the same camera pose. For instance, the electronic device 102 (e.g., processor 112) may perform one or more transforms (e.g. bilinear transforms) between images. In some configurations, the image aligner 118 may perform point feature matching, global image alignment, line segment feature matching, and/or grid-based image alignment. More detail for some approaches is provided in one or more of FIGS. 2-3, 7-8, 10-13, and 16-17.

In some configurations, the electronic device 102 (e.g., processor 112, image aligner 118, etc.) may include a point feature matcher 124, a global image aligner 130, a line segment feature matcher 116 and/or a grid-based image aligner 120. In some implementations, one or more of the point feature matcher 124, global image aligner 130, line segment feature matcher 116, and/or the grid-based image aligner 120 may be implemented separately and/or independently. For example, the point feature matcher 124, global image aligner 130, line segment feature matcher 116, and/or the grid-based image aligner 120 may be implemented in one or more blocks (e.g., circuitries) separate from the processor 112. In some configurations, the line segment feature matcher 116, the grid-based image aligner 120, the point feature matcher, and/or the global image aligner may not be included and/or implemented. For example, the image aligner 118 may utilize another approach for image alignment in some configurations.

The point feature matcher 124 may determine one or more point features corresponding to two or more images and/or may determine a point feature correspondence (e.g., match the point features) between the two or more images. For example, the point feature matcher 124 may determine point features of a first image and a second image. For instance, the point feature matcher 124 may determine point features of a wide-angle image (e.g., wide-angle image point features) and a telephoto image (e.g., telephoto image point features). Examples of point features may include keypoints, corners, Shi-Tomasi corners, ORBs, BRISKs, etc. The point feature matcher 124 may determine a point feature correspondence between point features of a first image (e.g., a wide-angle image) and point features of a second image (e.g., a telephoto image). The point feature correspondence may indicate a correspondence (e.g., a match, an association, etc.) between one or more of the point features of the first image and one or more of the point features of the second image.

The global image aligner 130 may align two or more images. For example, the global image aligner 130 may transform one or more images in order to approximately align the images. For instance, the global image aligner 130 may transform a second image (e.g., telephoto image) to align the second image with a first image (e.g., wide-angle image). The global image aligner 130 may utilize one or more transforms. Examples of transforms that may be performed by the global image aligner 130 may include a homography transform and an affine transform. In some configurations, the global image aligner 130 may align the images based on the point feature correspondence provided by the point feature matcher 124. For example, the point feature correspondence may indicate a disparity (e.g., distance, difference, "motion," etc.) between the images. The global image aligner 130 may transform one or more of the images in order to approximately align the corresponding point features between the images (e.g., wide-angle image and telephoto image).

The line segment feature matcher 116 may determine one or more line segments corresponding to two or more images and/or may determine a line segment feature correspondence (e.g., match the line segment features) between the two or more images (e.g., a first image and a second image). For example, the line segment feature matcher 116 may determine line segment features of a wide-angle image (e.g., wide-angle image line segment features) and a telephoto image (e.g., telephoto image line segment features). In some configurations, the line segment feature matcher 116 may include and/or utilize a line segment detector (LSD) to detect one or more line segments. Additionally or alternatively, the line segment feature matcher 116 may indicate and/or describe the line segments in accordance with a line band descriptor (LBD) to produce the line segment features. The line segment feature matcher 116 may determine a line segment feature correspondence between line segment features of a first image (e.g., a wide-angle image) and line segment features of a second image (e.g., a telephoto image). The line segment feature correspondence may indicate a correspondence (e.g., a match, an association, etc.) between one or more of the line segment features of the first image and one or more of the line segment features of the second image. This matching may be utilized to align the images (e.g., a telephoto image and a wide-angle image). More detail is provided in relation to one or more of FIGS. 3, 7-8, 12, and/or 16-17. Matching line segment features may help to align low texture regions (with too few point features, for example) and/or may help to maintain straight lines after warping. It should also be noted that aligning image using a global homography model may increase the matching success rate for line segments.

The electronic device 102 (e.g., processor 112, image aligner 118, etc.) may include and/or implement a grid-based image aligner 120. The grid-based image aligner 120 may perform grid-based image alignment between images (e.g., a first image and a second image). For example, the grid-based image aligner 120 may perform grid-based image alignment between a wide-angle image and a telephoto image to produce a warped telephoto image. In some configurations, grid-based image alignment may include defining a mesh grid (e.g., a uniform mesh grid) on an image (e.g., the wide-angle image) and parameterizing the disparity (e.g., difference, "motion," etc.) using the corresponding coordinates of grid vertices on another image (e.g., the telephoto image). For example, the electronic device 102 may define a grid mesh (e.g., a uniform grid mesh) on a first image (e.g., the wide-angle image). The grid mesh may be structured in accordance with grid lines and vertices. For example, grid lines may be spaced (e.g., uniformly spaced or non-uniformly spaced) along horizontal and vertical dimensions of the first image (e.g., the wide-angle image) or a subset of the first image. Grid vertices may be located at the intersections of the horizontal and vertical grid lines. The electronic device 102 may determine corresponding vertices on a second image (e.g., the telephoto image). For example, the electronic device 102 may determine vertices on the second image (e.g., telephoto image) that correspond to (e.g., match) the vertices of the grid mesh of the first image. Due to differences between the images, the vertices of the second image may be arranged differently (e.g., spaced differently, arranged non-uniformly, etc.) than the vertices of the first image. The differences between the vertices may indicate (e.g., parameterize) the disparity (e.g., "motion") between the images.

Grid cells may be sections of an image (e.g., of the wide-angle image and/or of the telephoto image) within spaces between grid lines and/or may include bordering grid lines in some approaches. For example, a grid cell may be a block of an image between grid lines (e.g., between two vertical grid lines and between two horizontal grid lines, between grid lines connecting vertices, etc.), with grid vertices at the cell corners.

In some configurations, the grid-based image aligner 120 may compute warped grid vertices to minimize an objective function. The objective function may include one or more terms. Examples of terms may include point feature re-projection error, line segment feature re-projection error, and a shape-preserving term. For instance, aligning images (e.g., a telephoto image to a wide-angle image) may include reducing (e.g., minimizing) re-projection errors of matched point features and matched line segment features while preserving rigidity. More detail is provided in relation to one or more of FIGS. 2, 7-8, 10-13, and/or 16-17.

The processor 112 may include and/or implement an image compositer 122. The image compositer 122 may composite (e.g., combine, fuse, stitch, etc.) images to form a composite image. For example, the image compositer 122 may replace image data from one image (e.g., a wide-angle image) with image data from another image (e.g., a telephoto image) and/or may combine image data from multiple images to produce the composite image. For instance, the image compositer 122 may composite a telephoto image with a wide-angle image. The field of view (FOV) of an image (e.g., the telephoto image) may be within (e.g., may be a subset of) the FOV of another image (e.g., the wide-angle image) in some implementations.

In some configurations, the image compositer 122 may include a seam selector 136 and/or an image blender 138. In some implementations, one or more of the seam selector 136 and/or image blender 138 may be implemented separately and/or independently. For example, the seam selector 136 and/or image blender 138 may be implemented in one or more blocks (e.g., circuitries) separate from the processor 112. In some configurations, the seam selector 136 and/or image blender 138 may not be included and/or implemented. For example, the image compositer 122 may utilize another approach for image compositing in some configurations.

The seam selector 136 may determine a seam between images (e.g., a wide-angle image and a telephoto image). In some approaches, determining the seam may be based on a bias term that favors selecting a particular image (e.g., telephoto image data and/or pixels from the telephoto image). The images may be composited by stitching the images along a seam and/or discarding extra image data. For example, the image compositer 122 may composite the wide-angle image and a warped telephoto image based on the seam. In some configurations, the seam selector 136 may composite images (e.g., a wide-angle image and a telephoto image) to produce a first composite image (e.g., initial composite image). More detail is provided in relation to one or more of FIGS. 2, 4, 7, 9, and/or 15-17.

The image blender 138 may blend images (e.g., first and second images, a wide-angle image and a telephoto image, etc.). Different images (e.g., images from different image sensors 104) may exhibit different exposure and/or color balance. The image blender 138 may blend image gradients and/or may make color consistent along the boundary between images. In some approaches, the image blender 138 may perform Poisson editing. For example, the image blender 138 may perform Poisson editing for color and intensity matching (e.g., solve a Poisson equation) in some approaches to blend the images. More detail is provided in relation to one or more of FIGS. 5, 7, 9, 14, and/or 16-17.

In some configurations, the image blender 138 may blend reduced detail images (e.g., downsampled images). For example, the image blender 138 may blend a reduced detail first composite image (e.g., an initial composite image) with a reduced detail first image (e.g., reduced detail wide-angle image) to produce a reduced detail blended image. The image blender 138 may add detail from the first composite image to an image based on the reduced detail blended image to produce a second composite image (e.g., a final composite image). More detail is provided in relation to one or more of FIGS. 5, 7, 9, 14, and/or 16-17.

In some approaches, the image blender 138 may downsample the first composite image to produce the reduced detail first composite image. The image blender 138 may downsample the first image (e.g., wide-angle image) to produce the reduced detail first image (e.g., wide-angle image). The image blender 138 may blend (e.g., perform gradient-domain image blending on) the reduced detail first composite image with the reduced detail first image (e.g., reduced detail wide-angle image) to produce a reduced detail blended image. The image blender 138 may determine a difference between the reduced detail blended image and the reduced detail first composite image to produce a difference image. The image blender 138 may upsample the difference image to produce an upsampled difference image. The image blender 138 may add detail from the first composite image to the upsampled difference image to produce the second composite image. More detail is provided in relation to one or more of FIGS. 5, 7, 9, 14, and/or 16-17.

It should be noted that one or more of the elements or components of the electronic device 102 may be combined and/or divided. For example, one or more of the image obtainer 114, the image aligner 118, the point feature matcher 124, the global image aligner 130, the line segment feature matcher 116, the grid-based image aligner 120, the image compositer 122, the seam selector 136, and/or the image blender 138 may be combined. Additionally or alternatively, one or more of the image obtainer 114, the image aligner 118, the point feature matcher 124, the global image aligner 130, the line segment feature matcher 116, the grid-based image aligner 120, the image compositer 122, the seam selector 136, and/or the image blender 138 may be divided into elements or components that perform a subset of the operations thereof.

Figure 2:
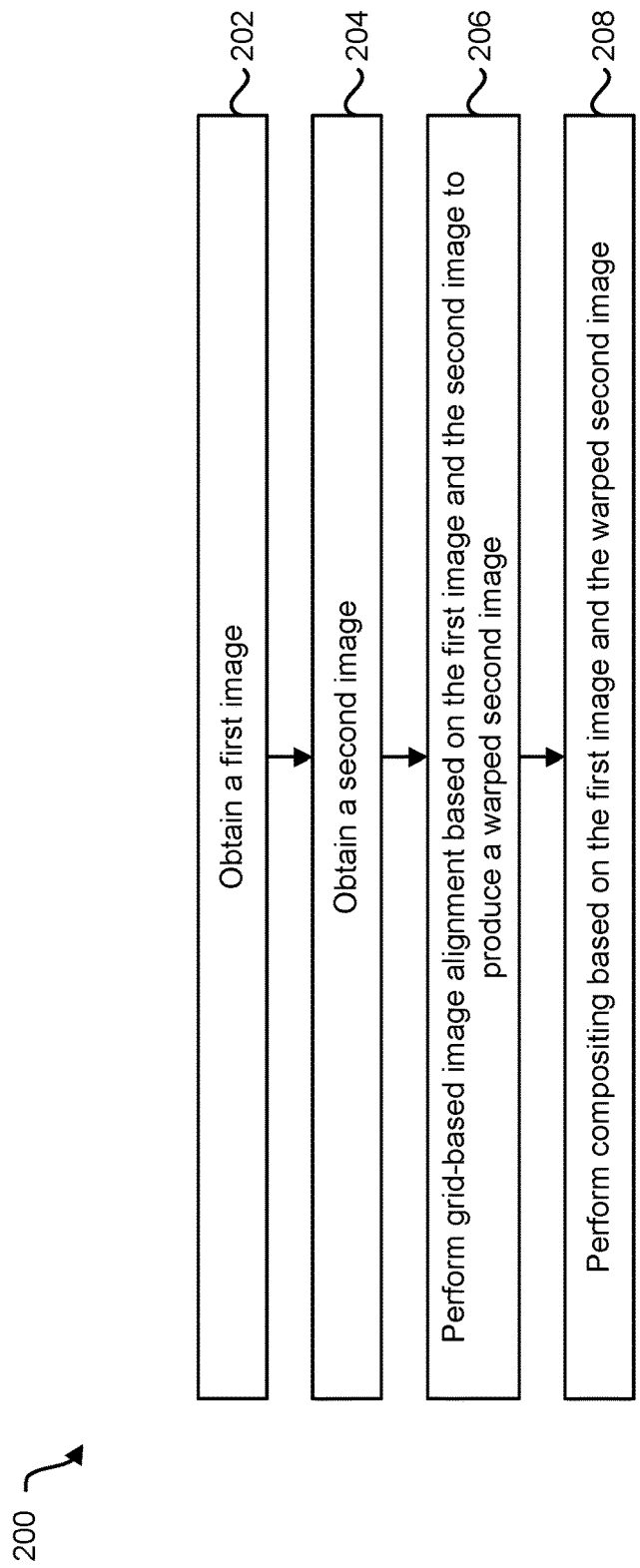
FIG. 2 is a flow diagram illustrating one configuration of a method for aligning and compositing images.

FIG. 2 is a flow diagram illustrating one configuration of a method 200 for aligning and compositing images. The method 200 may be performed by the electronic device 102, for example. In some configurations, FIG. 2 may provide a high-level method of an algorithm (e.g., a compositing algorithm, a fusion algorithm, etc.), where step 206 may correspond to one or more procedures described in relation to FIG. 3 and/or where step 208 may correspond to one or more procedures described in relation to one or more of FIGS. 4 and 5.

The electronic device 102 may obtain 202 a first image (e.g., wide-angle image). This may be accomplished as described in relation to FIG. 1. For example, the electronic device 102 may capture a wide-angle image (with a wide-angle lens, for instance) or may receive a wide-angle image from another device.

The electronic device 102 may obtain 204 a second image (e.g., telephoto image). This may be accomplished as described in relation to FIG. 1. For example, the electronic device 102 may capture a telephoto image (with a telephoto lens, for instance) or may receive a telephoto image from another device.

The electronic device 102 may perform 206 grid-based image alignment between the first image and the second image to produce a warped second image (e.g., a warped telephoto image). This may be accomplished as described in relation to FIG. 1. For example, the electronic device 102 may compute warped grid vertices to minimize an objective function with one or more terms (e.g., point feature re-projection error, line segment feature re-projection error, and/or a shape-preserving term). In some configurations, performing 206 grid-based image alignment may be accomplished in accordance with one or more of the procedures described in relation to FIG. 3. More detail is provided in relation to one or more of FIGS. 3, 7-8, 10-13, and/or 16-17.

The electronic device 102 may perform 208 compositing based on the first image (e.g., wide-angle image) and the warped second image (e.g., warped telephoto image). This may be accomplished as described in relation to FIG. 1. For example, the electronic device 102 may perform image compositing (e.g., seam selection, compositing, and/or image blending) based on the wide-angle image and the warped telephoto image. In some configurations, performing 208 compositing may be accomplished in accordance with one or more of the procedures described in relation to one or more of FIGS. 4-5. More detail is provided in relation to one or more of FIGS. 4-7, 9, and/or 14-17.

Figure 3:
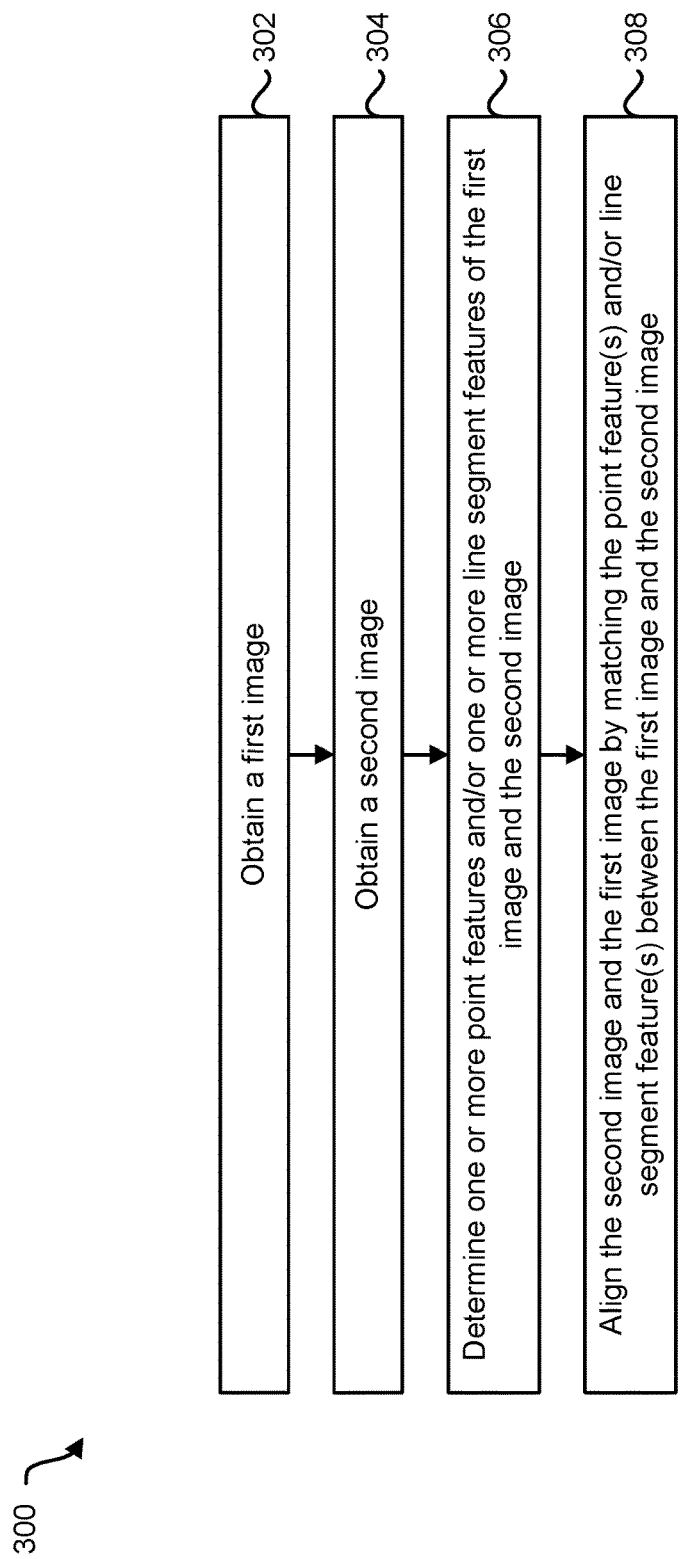
FIG. 3 is a flow diagram illustrating one configuration of a method for aligning images.

FIG. 3 is a flow diagram illustrating one configuration of a method 300 for aligning images. The method 300 may be performed by the electronic device 102, for example.

The electronic device 102 may obtain 302 a first image (e.g., wide-angle image). This may be accomplished as described in relation to one or more of FIGS. 1-2. For example, the electronic device 102 may capture a first image (e.g., wide-angle image with a wide-angle lens, for instance) or may receive a first image (e.g., wide-angle image) from another device.

The electronic device 102 may obtain 304 a second image (e.g., telephoto image). This may be accomplished as described in relation to one or more of FIGS. 1-2. For example, the electronic device 102 may capture a second image (e.g., telephoto image with a telephoto lens, for instance) or may receive a second image (e.g., telephoto image) from another device.

The electronic device 102 may determine 306 one or more point features and/or line segment features of the first image (e.g., wide-angle image) and the second image (e.g., telephoto image). This may be accomplished as described in relation to FIG. 1. For example, the electronic device 102 may determine (e.g., detect) one or more point features of the first image and the second image. The point feature(s) may be utilized for image alignment. In some configurations, the electronic device 102 may determine at least one first image (e.g., wide-angle image) line segment feature and at least one second image (e.g., telephoto image) line segment feature. For example, line segment features may be optional and may be utilized to improve alignment quality. In some approaches, the electronic device 102 may determine one or more point features and/or one or more sets of points corresponding to one or more line segments (e.g., endpoints and/or grid cell boundary intersection points) based on the first image (e.g., wide-angle image) and/or the second image (e.g., telephoto image). More detail is provided in relation to one or more of FIGS. 7-8, 11-12, and/or 16-17.

The electronic device 102 may align 308 the second image (e.g., telephoto image) and the first image (e.g., wide-angle image) by matching the point feature(s) and/or line segment feature(s) between the first image and the second image. This may be accomplished as described in relation to FIG. 1. For example, the electronic device 102 may match the point feature(s) and/or line segment feature(s) of the second image (e.g., telephoto image) to the point feature(s) and/or line segment feature(s) of the first image (e.g., wide-angle image). For instance, the electronic device 102 may match one or more detected point features of the second image (e.g., telephoto image) to one or more point features of the first image (e.g., wide-angle image). Additionally or alternatively, the electronic device 102 may match the at least one second image (e.g., telephoto image) line segment feature to the at least one first image (e.g., wide-angle image) line segment feature. For example, the electronic device 102 may minimize an objective function that includes a point feature re-projection error term and/or a line segment feature re-projection error term. More detail is provided in relation to one or more of FIGS. 7-8, 10-12, and/or 16-17.

Figure 4:
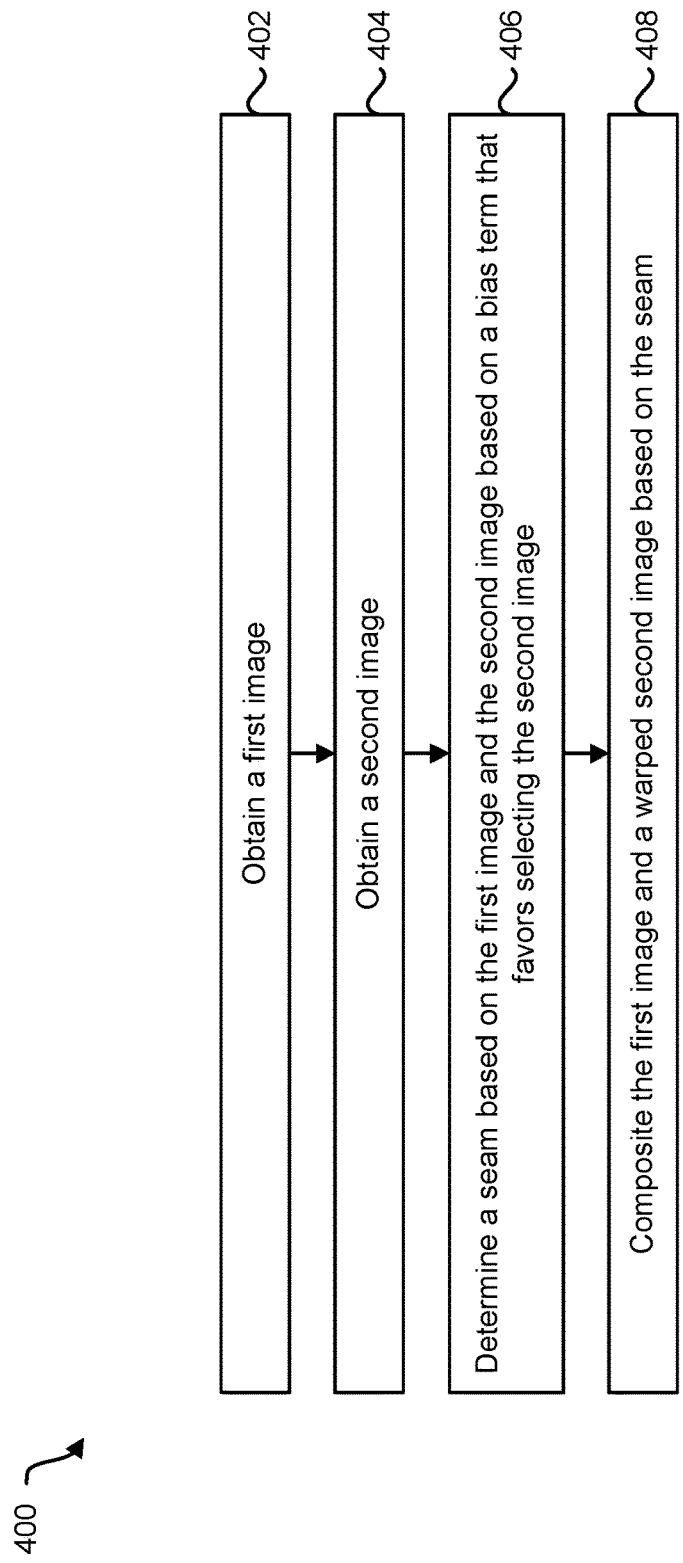
FIG. 4 is a flow diagram illustrating one configuration of a method for compositing images.

FIG. 4 is a flow diagram illustrating one configuration of a method 400 for compositing images. The method 400 may be performed by the electronic device 102, for example.

The electronic device 102 may obtain 402 a first image (e.g., wide-angle image). This may be accomplished as described in relation to one or more of FIGS. 1-3. For example, the electronic device 102 may capture a first image (e.g., wide-angle image with a wide-angle lens, for instance) or may receive a first image (e.g., wide-angle image) from another device.

The electronic device 102 may obtain 404 a second image (e.g., telephoto image). This may be accomplished as described in relation to one or more of FIGS. 1-3. For example, the electronic device 102 may capture a second image (e.g., telephoto image with a telephoto lens, for instance) or may receive a second image (e.g., telephoto image) from another device. In some configurations, the electronic device 102 may warp the second image to produce a warped second image (e.g., warped telephoto image). For example, the electronic device 102 may align the second image to the first image as described in relation to FIG. 3 by warping the second image.

The electronic device 102 may determine 406 a seam based on the first image and the second image (e.g., the warped second image, warped telephoto image, etc.). For one or more pixels (e.g., each pixel) in a co-visible region, for example, the electronic device 102 may select a pixel from one of the images (e.g., the first image, wide-angle image etc.) or the second image (e.g., warped second image, warped telephoto image, etc.). Each selected pixel may be included in a composite image (e.g., a first composite image, an initial composite image, a final composite image, etc.). In some configurations, determining 406 the seam may be based on a bias term that favors selecting the second image (e.g., second image data, second image pixels, warped second image data, etc.). This may be accomplished as described in relation to FIG. 1. For example, the electronic device 102 may determine a seam where differences between pixels from the images are minimal. More detail is provided in relation to one or more of FIGS. 7, 9, and/or 15-17.

The electronic device 102 may composite 408 the first image (e.g., wide-angle image) and a warped second image (e.g., warped telephoto image) based on the seam. This may be accomplished as described in relation to FIG. 1. For example, the electronic device 102 may merge pixels from the warped second image with pixels from the first image. For instance, the electronic device 102 may replace one or more pixels (or interpolations thereof) of the first image in the co-visible region with one or more pixels (or interpolations thereof) of the second image and may discard unselected pixels (of the first image and/or of the second image, for example). Compositing 408 the first image (e.g., wide-angle image) and the second image (e.g., telephoto image) may produce a first composited image (e.g., initial composited image). More detail is provided in relation to one or more of FIGS. 7, 9, and/or 15-17.

Figure 5:
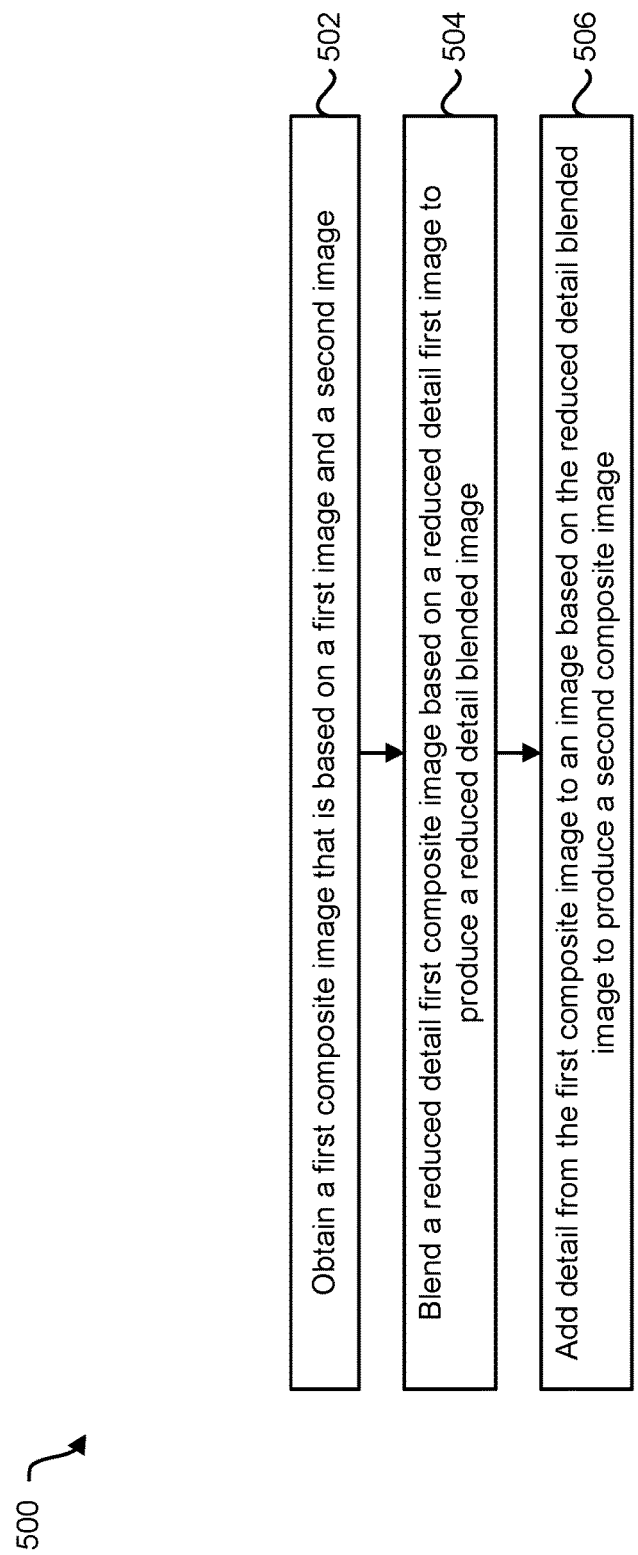
FIG. 5 is a flow diagram illustrating one configuration of an additional method for compositing images.

FIG. 5 is a flow diagram illustrating one configuration of an additional method 500 for compositing images. The method 500 may be performed by the electronic device 102, for example.

The electronic device 102 may obtain 502 a first composite image that is based on a first image (e.g., wide-angle image) and a second image (e.g., telephoto image). This may be accomplished as described in relation to one or more of FIGS. 1-4. For example, the electronic device 102 may obtain a first image and a second image, may align the first image and second image, and/or may perform seam selection and compositing to obtain 502 the first composite image (e.g., initial composite image). In another example, the electronic device 102 may receive the first composite image from another device. For example, another device may composite a first image (e.g., wide-angle image) and a second image (e.g., telephoto image) to produce the first composite image, which may be provided to the electronic device 102.

The electronic device 102 may blend 504 a reduced-detail (e.g., downsampled) first composite image based on a reduced detail (e.g., downsampled) first image (e.g., reduced detail wide-angle image) to produce a reduced detail blended image. This may be accomplished as described in relation to FIG. 1. For example, the electronic device 102 may blend image gradients and/or may make color consistent along the boundary (e.g., seam) between first image data and warped second image data. For instance, the gradient of the first composite image within the co-visible region (e.g., the gradient of the warped second image in the co-visible region) may be transferred to the blended image with a boundary condition that the intensity (e.g., color) at the boundary (e.g., seam) is the same as the corresponding intensity of the first image (e.g., reduced detail wide angle image). In some configurations, the electronic device 102 may solve a Poisson equation to perform the blending 504. More detail is provided in relation to one or more of FIGS. 7, 9, 14, and/or 16-17.

The electronic device 102 may add 506 detail from the first composite image to an image based on the reduced detail blended image to produce a second composite image. This may be accomplished as described in relation to FIG. 1. For example, adding 506 detail from the first composite image may restore detail that may have been lost in initially reducing the detail of the first composite image for blending. More detail is provided in relation to one or more of FIGS. 7, 9, 14, and/or 16-17. It should be noted that different orders of operation may be implemented in one or more of the methods 200, 300, 400, 500, 1700 described herein in some configurations.

Figure 6:
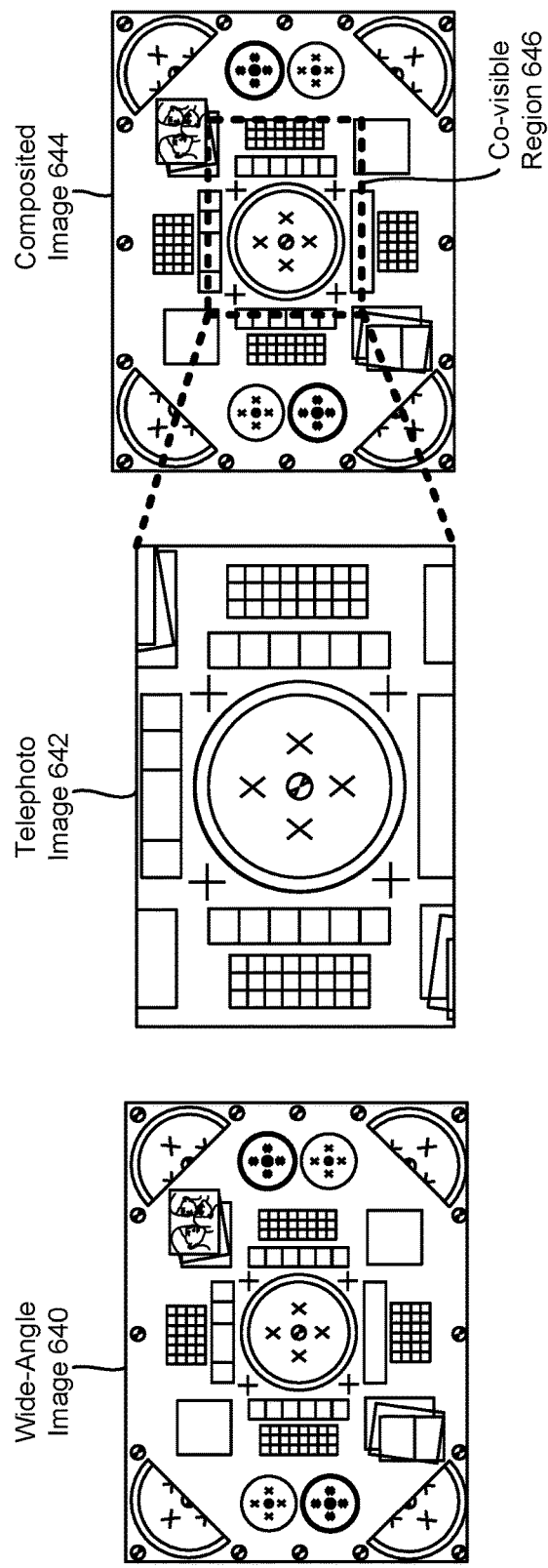
FIG. 6 is a diagram illustrating an example of a wide-angle image, a telephoto image, and a composited image of the wide-angle image and the telephoto image.

FIG. 6 is a diagram illustrating an example of a wide-angle image 640, a telephoto image 642, and a composited image 644 of the wide-angle image 640 and the telephoto image 642. One objective of some configurations of the systems and methods disclosed herein may be to composite (e.g., fuse) an image pair captured from a wide-angle lens and a telephoto lens. The wide view angle of the wide-angle lens may capture more image content. Higher quality (e.g., more details, less noise, etc.) may be provided in a co-visible region (similar to an optical zoom, for example). Accordingly, some configurations of the systems and methods disclosed herein may allow compositing (e.g., fusing) images without visible seams caused by parallax and/or exposure/color mismatch.

As illustrated in FIG. 6, the telephoto image 642 may include a field of view (FOV) that is within (e.g., is a subset of) the FOV of the wide-angle image 640. Accordingly, some configurations of the systems and methods disclosed herein may provide a composited image that covers a FOV of a wide-angle image 640 while providing more detail and/or less noise in a co-visible region 646 between the wide-angle image 640 and the telephoto image 642.

Figure 7:
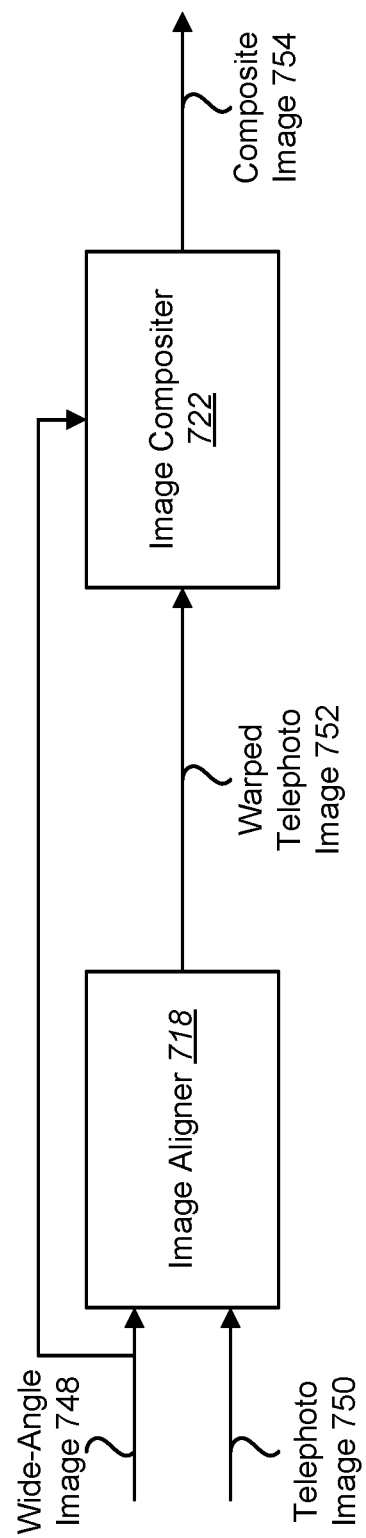
FIG. 7 is a block diagram illustrating an example of elements, components, blocks, and/or of an algorithm that may be implemented in accordance with some configurations of the systems and methods disclosed herein.

FIG. 7 is a block diagram illustrating an example of elements, components, blocks, and/or of an algorithm that may be implemented in accordance with some configurations of the systems and methods disclosed herein (for seamless image compositing, for example). In particular, FIG. 7 illustrates an image aligner 718 and an image compositer 722. The image aligner 718 may be an example of the image aligner 118 described in relation to FIG. 1. In some configurations, the image aligner 718 may include a grid-based image aligner and/or may perform grid-based image alignment. Additionally or alternatively, the image compositer 722 may be an example of the image compositer 122 described in relation to FIG. 1.

As illustrated in FIG. 7, image alignment (e.g., grid-based image alignment) may be performed on a wide-angle image 748 (e.g., a wide-cam image) and a telephoto image 750 (e.g., a tele-cam image) to produce a warped telephoto image 752 (e.g., warped tele-cam image). In some configurations, the image aligner 118 may be implemented in accordance with the description provided in relation to one or more of FIGS. 8, 10-13, and/or 16-17. The warped telephoto image 752 and the wide-angle image 748 may be provided to the image compositer 722. The image compositer 722 may composite (e.g., perform seamless image compositing between) the wide-angle image 748 and the warped telephoto image 752 to produce a composite image 754. In some configurations, the image compositer 722 may be implemented in accordance with the description provided in relation to one or more of FIGS. 9 and/or 14-17.

Figure 8:
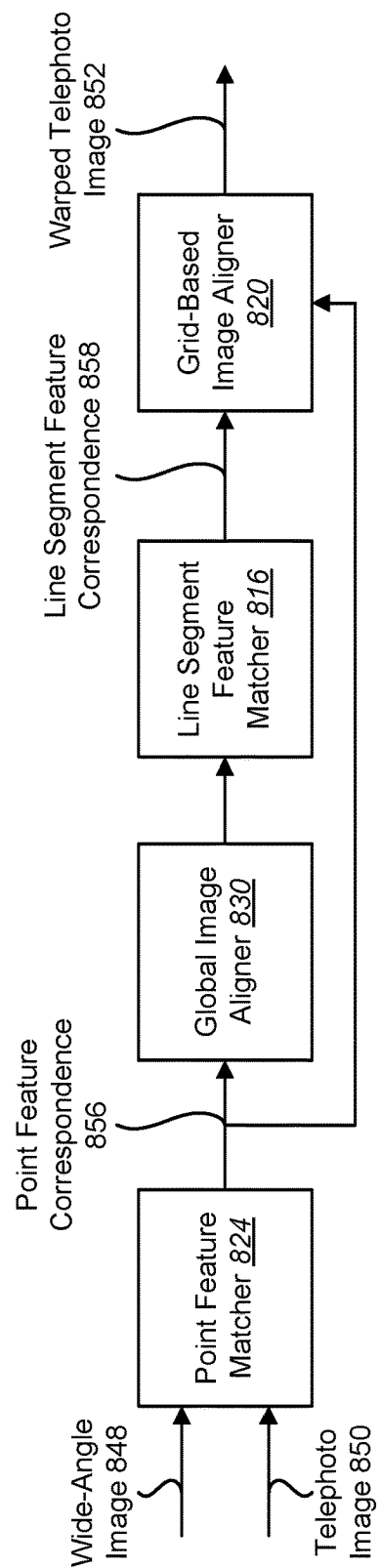
FIG. 8 is a block diagram illustrating an example of elements, components, blocks, and/or of an algorithm for image alignment that may be implemented in accordance with some configurations of the systems and methods disclosed herein.

FIG. 8 is a block diagram illustrating an example of elements, components, blocks, and/or of an algorithm for image alignment that may be implemented in accordance with some configurations of the systems and methods disclosed herein. In particular, FIG. 8 illustrates a point feature matcher 824, a global image aligner 830, a line segment feature matcher 816, and a grid-based image aligner 820. For instance, one or more of the elements, components, blocks, and/or the algorithm described in relation to FIG. 8 may be implemented in the image aligner 718 described in relation to FIG. 7. Additionally or alternatively, one or more of the point feature matcher 824, global image aligner 830, line segment feature matcher 816, and grid-based image aligner 820 may be examples of corresponding elements described in relation to FIG. 1.

A wide-angle image 848 and a telephoto image 850 may be provided to the point feature matcher 824. The point feature matcher 824 may perform point feature matching on the wide-angle image 848 (e.g., a wide-cam image) and the telephoto image 850 (e.g., a tele-cam image) to produce point feature correspondence 856. For example, features may be used for disparity (e.g., "motion") estimation (e.g., image alignment). In some configurations, examples of matched point features may include Shi-Tomasi corner(s), ORB features, BRISK keypoints, etc. In some configurations, the point feature matcher 824 may detect one or more point features in each of the wide-angle image 848 and the telephoto image 850. In some approaches, point feature detection may only be performed in one or more co-visible regions (e.g., in a region of the wide-angle image 848 that is also visible in the telephoto image 850 and in the entire telephoto image 850, in the overlapping FOVs of the wide-angle image 848 and the telephoto image 850, etc.).

The point feature matcher 824 may determine the point feature correspondence 856 between the point features of the wide-angle image 848 and the telephoto image 850. For example, the point feature matcher 824 may determine whether a point feature of the wide-angle image 848 corresponds to (e.g., matches) a point feature of the telephoto image 850 based on a descriptor of the features. In some configurations, examples of feature descriptors may include intensities of image patches around the features, ORB descriptors, BRISK descriptors, etc. The point feature correspondence 856 may indicate the point features of the wide-angle image 848 that correspond to (e.g., match) point features of the telephoto image 850. The point feature correspondence 856 may be utilized for performing global image alignment and/or grid-based image alignment.

The global image aligner 830 may perform global image alignment between the wide-angle image 848 and the telephoto image 850. For example, the global image aligner 830 may approximately align the telephoto image 850 to the wide-angle image. Global alignment may include transforming (e.g., translating, rotating, and/or changing perspective of) an image (e.g., the telephoto image 850) to approximately match another image (e.g., the wide-angle image 848). In some approaches, the global image aligner 830 may perform a global image transformation (e.g., homography transform, affine transform, etc.). For example, an entire image (e.g., the telephoto image 850) may be transformed (e.g., rigidly transformed) to approximately match with another image (e.g., with a co-visible region in the wide-angle image 848). The global image alignment may be based on the point feature correspondence 856. For instance, the global image aligner 830 may align the wide-angle image 848 and the telephoto image 850 using a global homography model that may be estimated via random sample consensus (RANSAC) with the point features indicated by the point feature correspondence 856. The global image aligner 830 may produce one or more globally aligned images.

One or more globally aligned images (e.g., the telephoto image 850 that is globally aligned the wide-angle image 848) may be provided to the line segment feature matcher 816. For example, the globally aligned images may be utilized for line segment feature matching to produce line segment feature correspondence 858. For instance, the line segment feature matcher 816 may detect line segments (e.g., line segment end points and/or one or more points along line segments) in the wide-angle image 848 and/or the telephoto image 850. Line segment features corresponding to the wide-angle image 848 (e.g., the globally aligned wide-angle image) may be referred to as wide-angle image line segment features. Line segment features corresponding to the telephoto image 850 (e.g., the globally aligned telephoto image) may be referred to as telephoto image line segment features. In some configurations, the line segment feature matcher 816 may utilize and/or include a line segment detector (LSD) for detecting line segment features in the wide-angle image 848 and/or the telephoto image 850 (e.g., the globally aligned and telephoto image 850 and wide-angle image 848). Additionally or alternatively, the line segment feature matcher 816 may indicate and/or describe the line segment features in accordance with a line band descriptor (LBD) in some approaches.

The line segment feature matcher 816 may match line segment features between images to produce the line segment feature correspondence 858. For example, the line segment feature matcher 816 may determine wide-angle image line segment features corresponding to (e.g., matching) and telephoto image line segment features. The line segment feature correspondence 858 may indicate the line segment features of the wide-angle image 848 that correspond to (e.g., match) line segment features of the telephoto image 850. The line segment feature correspondence 858 may be provided to the grid-based image aligner 820. Line segment feature matching may help to align low-texture regions (e.g., regions with too few point features). Additionally or alternatively, this may help to maintain straight lines after warping. In some configurations, images may be aligned using a global homography model (e.g., estimated via RANSAC with point features) to increase the matching success rate for line segments.

The line segment feature correspondence 858 may be utilized by the grid-based image aligner 820 for performing grid-based image alignment. Additionally or alternatively, the grid-based image aligner 820 may utilize the point feature correspondence 856 for performing grid-based image alignment. For example, the electronic device 102 may compute warped grid vertices to minimize the function expressed in Equation (1).

$$E(\hat{V}) = E_{point}(\hat{V}) + E_{line}(\hat{V}) + \alpha E_{similarity}(\hat{V}) \quad (1)$$

In Equation (1), $E(\hat{V})$ is an objective function for reduction (e.g., minimizing), $\hat{V}$ is a vector representation of all warped grid vertices, $E_{point}(\hat{V})$ is a re-projection error term of the point features, $E_{line}(\hat{V})$ is a re-projection error term of the line segment features, $\alpha$ is a tunable regularization weight, and $E_{similarity}(\hat{V})$ is shape-preserving term. The function expressed in Equation (1) may be a quadratic energy function. The function may be solved by a sparse linear system solver (e.g., LU factorization, conjugate gradient, etc.) in some configurations. The computed warped grid vertices may be used to warp the entire image. For example, a bilinear transformation may be applied on each grid cell. The bilinear transformation may be determined by the four corners of the grid cell. More detail is provided in relation to one or more of FIGS. 10-13 and/or 16-17.

Figure 9:
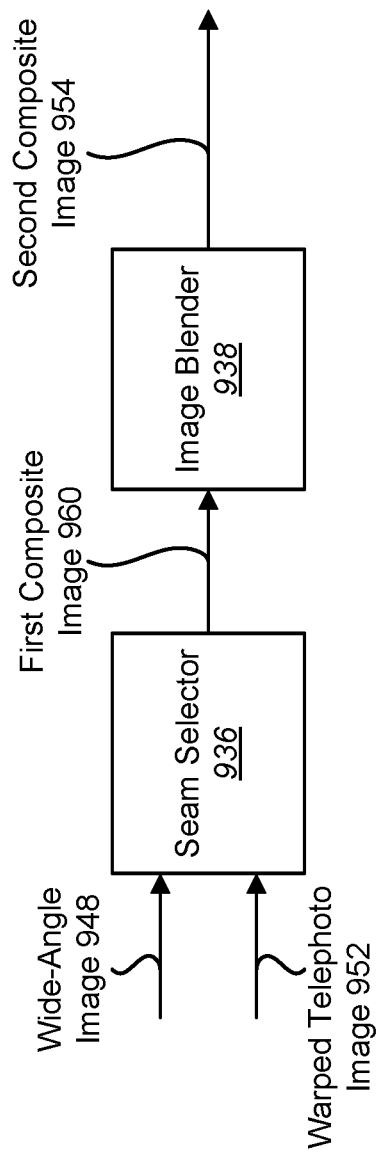
FIG. 9 is a block diagram illustrating an example of elements, components, blocks, and/or of an algorithm for image compositing that may be implemented in accordance with some configurations of the systems and methods disclosed herein.

FIG. 9 is a block diagram illustrating an example of elements, components, blocks, and/or of an algorithm for image compositing that may be implemented in accordance with some configurations of the systems and methods disclosed herein. In particular, FIG. 9 illustrates a seam selector 936 and a gradient domain image blender 938. For instance, one or more of the elements, components, blocks, and/or the algorithm described in relation to FIG. 9 may be implemented in the image compositer 722 described in relation to FIG. 7. Additionally or alternatively, one or more of the seam selector 936 and image blender 938 may be examples of corresponding elements described in relation to FIG. 1.

A wide-angle image 948 and a warped telephoto image 952 may be provided to the seam selector 936. The seam selector 936 may determine (e.g., select) a seam based on the wide-angle image 948 and the warped telephoto image 952. In some configurations, seam determination (e.g., optimal seam selection) may be performed as follows. Even after aligning (with a grid-based model (e.g., disparity model, motion model, etc.), for example) images may still be misaligned in some cases. The seam selector 936 may select a seam (e.g., a composition boundary, an "optimal" composition boundary, etc.) so images are aligned well along the boundary.

In some configurations, the seam selector 936 may determine (e.g., find) a label for each pixel in the co-visible region in accordance with Equation (2).

$$C_S = \sum_{(x,y) \in N} \|I_{l_x}(x) - I_{l_y}(x)\| + \|I_{l_x}(y) - I_{l_y}(y)\| + \lambda \sum_x I_{l_x}, \quad (2)$$

where $$l_x = \begin{cases} 0 & \text{Wide-angle image} \\ 1 & \text{Telephoto image (warped)} \end{cases}$$

In Equation (2), $C_s$ is an objective function for reduction (e.g., minimizing), x and y are a pair of neighboring pixels, N is a set of all pairs of neighboring pixels in the image, $I_0$ is the wide-angle image, $I_1$ is the telephoto image (e.g., warped telephoto image), l is a binary label that assigns each pixel to either the wide-angle image or the telephoto image (e.g., warped telephoto image), and $\lambda$ is a tunable weight. In accordance with the pairwise term ($\|I_{l_x}(x)-I_{l_y}(x)\|+\|I_{l_x}(y)-I_{l_y}(y)\|$) in Equation (2), intensities (and/or derivatives) should be consistent if labels are different. As described herein, determining a seam may be based on a bias term $$\left(\text{e.g., } \lambda \sum_x I_{l_x}\right)$$

that favors selecting telephoto image data (e.g., warped telephoto image data). For example, the bias term illustrated in Equation (2) may provide a bias to label a pixel as telephoto image data from a warped telephoto image.

Discontinuities or seam boundaries may often be more prominent in low frequency regions than in high frequency regions. In some configurations, the pairwise term in Equation (2) (e.g., an objective function) may be modified to Equation (3) to penalize (e.g., more heavily penalize) seams going through low frequency regions.

$$\frac{\|I_{l_x}(x) - I_{l_y}(x)\| + \|I_{l_x}(y) - I_{l_y}(y)\|}{\|\nabla_d I_{l_x}(x)\| + \|\nabla_d I_{l_x}(y)\| + \|\nabla_d I_{l_y}(x)\| + \|\nabla_d I_{l_y}(y)\|} \quad (3)$$

In some configurations, the graph optimization problem may be solved by max-flow. For example, Equations (2) and/or (3) may be solved with max-flow in some approaches.

The seam selector 936 may determine (e.g., produce) a first composite image 960 based on the selected seam. For example, the seam selector 936 may discard unselected pixels in the co-visible region. In some approaches, the pixels of the wide-angle image outside of the co-visible region may be utilized as an outer portion of the first composite image and selected pixels (e.g., pixels from the wide-angle image 948 or the warped telephoto image 952) within the co-visible region may be utilized as an inner portion of the first composite image 960. Other pixels may be discarded. For instance, unselected wide-angle image 948 pixels in the co-visible region may be discarded and replaced with selected pixels from the warped telephoto image 952 to produce the first composite image 960.

The first composite image 960 may be provided to the image blender 938. The image blender 938 may perform image blending on the first composite image 960 to produce a second (e.g., final) composite image 954. Two images (e.g., the wide-angle image 948 and the warped telephoto image 952) may have very different exposure and/or color balance. In some approaches, the image blender 938 may perform gradient-domain image blending. For example, the image blender 938 may blend only image gradients and make color consistent along the boundary (e.g., seam). In some configurations, gradient-domain image blending may be performed in accordance with Equation (4).

$$\min_{I_{out}} \int \int_{\Omega} \|\nabla I_{out} - \nabla I_{in}\|^2 \text{ with } I_{out}|_{\partial \Omega} = I_{wide}|_{\partial \Omega} \quad (4)$$

In Equation (4), $I_{out}$ denotes an image blender 938 output image (e.g., a the second composite image 954, a final fused image, etc.), $\Omega$ denotes a co-visible region (e.g., a region where the warped telephoto image 952 is utilized), $\nabla I_{out}$ denotes a gradient of the output image, $\nabla I_{in}$ denotes a gradient of an image blender 938 input image (e.g., the first composite image 960, an initial fused image after seam selection, etc.), and $I_{wide}$ denotes the wide-angle image 948. A boundary condition (e.g., $I_{out|\partial\Omega}=I_{wide|\partial\Omega}$) may ensure that the color along the boundary (e.g., seam) between images (e.g., the wide-angle image 948 and the warped telephoto image) is the same (or approximately the same, for example). More detail is provided in relation to one or more of FIGS. 14-17.

FIG. 10 is a diagram illustrating an example of grid-based image alignment. In particular, FIG. 10 illustrates an example of a grid mesh 1060 (e.g., a uniform grid mesh) and a warped grid mesh 1062. Grid-based image alignment may be performed in some configurations of the systems and methods disclosed herein. Grid-based image alignment may be based on (e.g., may utilize) a grid-based image warping model. The grid-based image warping model may be more flexible than global image transformations (e.g., homography, affine, etc.) in handling parallax between two images. Grid-based image alignment may include defining a grid mesh 1060 (e.g., a uniform grid mesh) on one of the images (e.g., the telephoto image) and parameterizing the displacement (e.g., "motion") between two images using the corresponding coordinates of all grid vertices in the other image (e.g., the wide-angle image).

Figure 11:
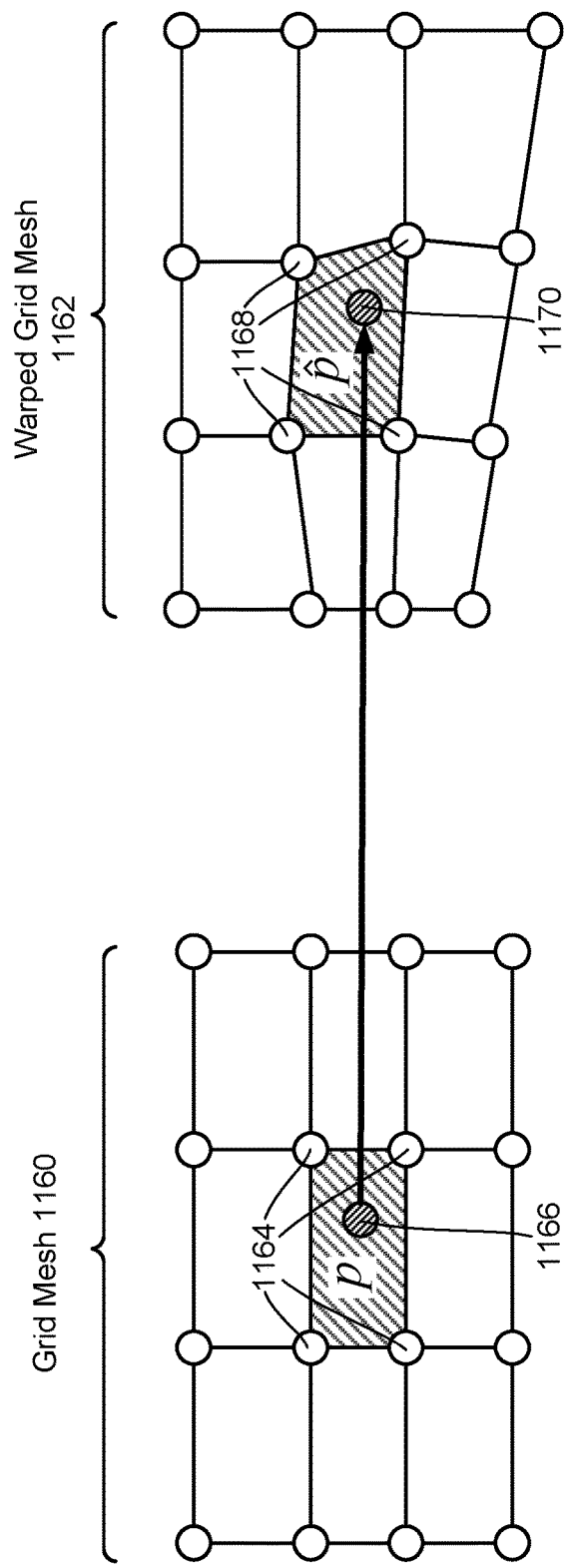
FIG. 11 is a diagram illustrating more detail of some approaches for grid-based image alignment that may be implemented in some configurations of the systems and methods disclosed herein.

FIG. 11 is a diagram illustrating more detail of some approaches for grid-based image alignment that may be implemented in some configurations of the systems and methods disclosed herein. In particular, FIG. 11 illustrates a grid mesh 1160 (e.g., a uniform grid mesh) including a grid vertices and a warped grid mesh 1162 including warped grid vertices. In order to align the images, warped grid vertices 1168 may be computed to minimize a function (e.g., an objective function). One example of a function that may be minimized for determining warped grid vertices is provided in Equation (1).

As described herein, the function may include a re-projection error of one or more point features (e.g., $E_{point}(\hat{V})$). In some configurations, the point feature re-projection error may be minimized using a bilinear transform in accordance with Equation (5).

$$E_{point}(\hat{V}) = \sum_p \|\hat{V}_p w_p - \hat{p}\|^2 \quad (5)$$

In accordance with Equation (5), p denotes the coordinates of a point feature in one image, $\hat{p}$ denotes the matched point corresponding to p in the other image, $$V_p = [v_p^1, v_p^2, v_p^3, v_p^4]$$

denotes vertices of an enclosing grid cell of p, $$\hat{V}_p = [\hat{v}_p^1, \hat{v}_p^2, \hat{v}_p^3, \hat{v}_p^4]$$

denotes corresponding vertices of $V_p$ in the warped grid mesh, and $$w_p = [w_p^1, w_p^2, w_p^3, w_p^4]$$

are bilinear interpolation coefficients to represent p using $V_p$. The point feature re-projection error (e.g., $E_{point}(\hat{V})$) may be an example of one term of an objective function for grid-based image alignment. For example, the point feature re-projection error may be minimized (with or without one or more other terms) in performing grid-based image alignment.

In the example illustrated in FIG. 11, an image point p 1166 is enclosed in a grid cell with vertices 1164. A corresponding warped image point $\hat{p}$ 1170 is enclosed in a grid cell of the warped grid mesh 1162 with vertices 1168. As can be observed in the example of FIG. 11, grid-based warping may allow for flexibly warping different portions (e.g., grid cells) of an image to provide grid-based image alignment.

Figure 12:
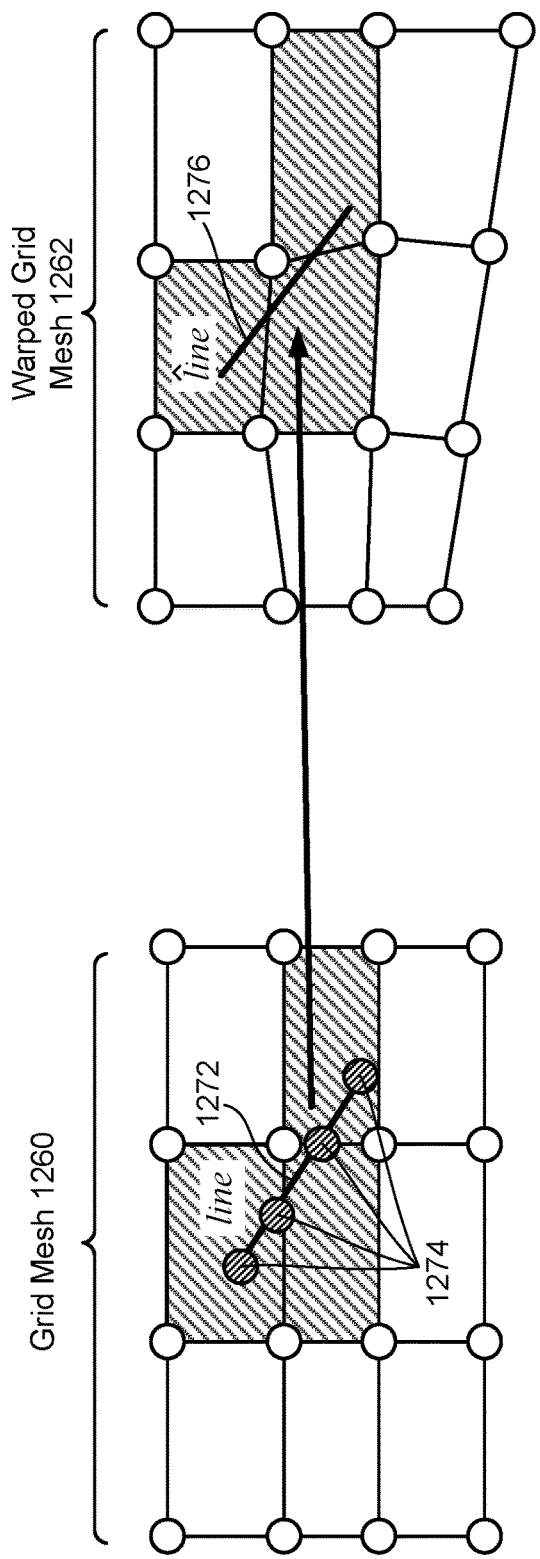
FIG. 12 is a diagram illustrating more detail of some approaches for grid-based image alignment.

FIG. 12 is a diagram illustrating more detail of some approaches for grid-based image alignment. In particular, FIG. 12 illustrates a grid mesh 1260 (e.g., a uniform grid mesh) and a warped grid mesh 1162. In order to align the images, the warped grid mesh 1262 may be computed to minimize a function (e.g., an objective function). One example of a function that may be minimized for determining a warped grid mesh is provided in Equation (1).

As described herein, the function may include a re-projection error of one or more line features (e.g., $E_{line}(\hat{V})$). In some configurations, the line feature re-projection error may be minimized in accordance with Equation (6).

$$E_{line}(\hat{V}) = \sum_{line} \sum_k \|\text{dist}(\hat{V}_{line_k}, w_{line_k}, \hat{line})\|^2 \quad (6)$$

In accordance with Equation (6), $\{line_k\}$ denotes a set of points on line (including two end points and any intersection points with grid cell boundaries, for example), $$V_{line_k} = [v_{line_k}^1, v_{line_k}^2, v_{line_k}^3, v_{line_k}^4]$$

denotes vertices of an enclosing grid cell of line$_k$, $$\hat{V}_{line_k} = [\hat{v}^1_{line_k}, \hat{v}^2_{line_k}, \hat{v}^3_{line_k}, \hat{v}^4_{line_k}]$$

denotes corresponding vertices of $V_{line_k}$ in the warped grid mesh, $$w_{line_k} = [w^1_{line_k}, w^2_{line_k}, w^3_{line_k}, w^4_{line_k}]$$

are bilinear interpolation coefficients to represent line$_k$ using $V_{line_k}$, and dist(,) is a distance from a point to a line segment. The line feature re-projection error (e.g., $E_{line}(\hat{V})$) may be an example of one term of an objective function for grid-based image alignment. For example, the line feature re-projection error may be minimized (with or without one or more other terms) in performing grid-based image alignment.

In the example illustrated in FIG. 12, a line 1272 has a set of points 1274 including end points and intersection points with grid cell boundaries. A corresponding line (l̂ine) 1276 is illustrated with the warped grid mesh 1262. As can be observed in the example of FIG. 12, maintaining straight lines may be one factor in some approaches to grid-based image alignment.

Figure 13:
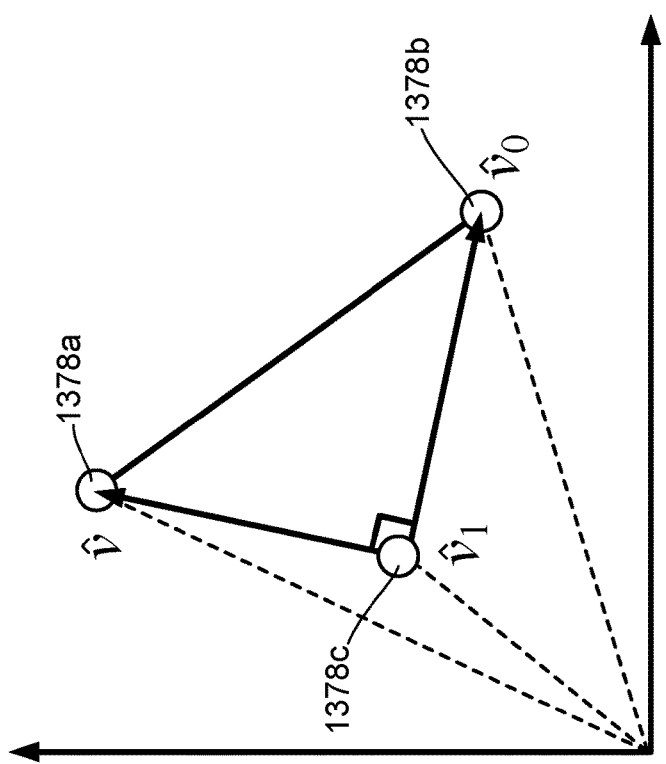
FIG. 13 is a diagram illustrating more detail of some approaches for grid-based image alignment.

FIG. 13 is a diagram illustrating more detail of some approaches for grid-based image alignment. In particular, FIG. 13 illustrates an example of vertices 1378a-c for a shape preserving term. In order to align the images, a warped grid mesh may be computed to minimize a function (e.g., an objective function). One example of a function that may be minimized for determining a warped grid mesh is provided in Equation (1).

As described herein, the function may include a shape-preserving term (e.g., $E_{similarity}(\hat{V})$). In some configurations, the shape-preserving term may be minimized to make transformation of each grid cell approach (e.g., as close as possible to) a similarity transformation. This may be accomplished in accordance with Equation (7).

$$E_{similarity}(\hat{V}) = \sum_{\hat{v}} \|\hat{v} - \hat{v}_1 - sR_{90}(\hat{v}_0 - \hat{v}_1)\|^2 \qquad (7)$$

In accordance with Equation (7), $\hat{v}_0$ and $\hat{V}_1$ are two neighboring vertices that form a triangle with vertex $\hat{V}$, $s=\|v-v_1\|/\|v_0-v_1\|$ may be a scalar (e.g., known scalar) that may be computed from corresponding vertices in a grid mesh (e.g., an initial grid mesh, a uniform grid mesh, etc.), and $$R_{90} = \begin{bmatrix} 0 & 1 \\ -1 & 0 \end{bmatrix}$$

is a rotation matrix (e.g., a 90 degree rotation matrix). The shape-preserving term (e.g., $E_{similarity}(\hat{V})$) may be an example of one term of an objective function for grid-based image alignment. For example, the shape-preserving term may be minimized (with or without one or more other terms) in performing grid-based image alignment.

In the example illustrated in FIG. 13, three vertices ($\hat{v}$, $\hat{v}_0$, and $\hat{V}_1$) 1378a-c may be taken into account in transforming a grid cell to preserve shape. Accordingly, maintaining shape may be one factor in some approaches to grid-based image alignment.

Figure 14:
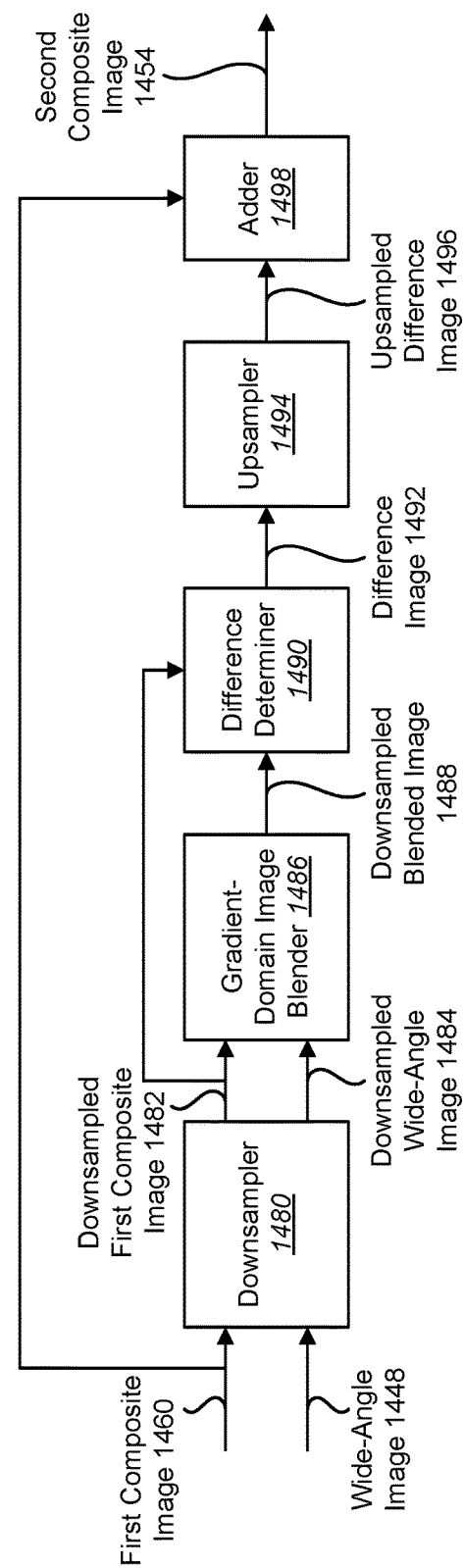
FIG. 14 is a block diagram illustrating an example of elements, components, blocks, and/or of an algorithm for image blending that may be implemented in accordance with some configurations of the systems and methods disclosed herein.

FIG. 14 is a block diagram illustrating an example of elements, components, blocks, and/or of an algorithm for image blending that may be implemented in accordance with some configurations of the systems and methods disclosed herein. In particular, FIG. 14 illustrates a downsampler 1480, a gradient-domain image blender 1486, a difference determiner 1490, an upsampler 1494, and an adder 1498. For instance, one or more of the elements, components, blocks, and/or the algorithm described in relation to FIG. 14 may be implemented in the image compositer 722 described in relation to FIG. 7. Additionally or alternatively, one or more of the downsampler 1480, gradient-domain image blender 1486, difference determiner 1490, upsampler 1494, and adder 1498 may be implemented in one or more of the image blenders 138 described in relation to FIG. 1 and FIG. 9. For example, the electronic device 102 may perform gradient-domain image blending.

As described in relation to FIG. 9, two images may have very different exposure and/or color balance. Accordingly, blending may be performed in accordance with Equation (4). It should be noted that Equation (4) illustrates a Poisson equation. A Poisson equation may be relatively computationally complex and/or slow to solve. It may be observed that the difference caused by exposure and/or color balance may vary slowly in the spatial domain. Accordingly, gradient-domain image blending may be performed on reduced-detail (e.g., downsized, downsampled, etc.) images in some approaches.

In the example illustrated in FIG. 14, blending may be applied to one or more downsampled images and an upsampled difference may be added back. Details may be added back to an upsampled image. In particular, a first composite image 1460 may be provided to the downsampler 1480 and to the adder 1498. The downsampler 1480 may downsample the first composite image 1460 to produce a downsampled first composite image 1482 (e.g., a reduce-detail image). For example, the downsampler 1480 may remove a portion of image data (e.g., may retain only a portion or fraction of image data, pixels, etc.). The downsampled first composite image 1482 may be provided to the gradient-domain image blender 1486 and to the difference determiner 1490.

A wide-angle image 1448 may also be provided to the downsampler 1480. The downsampler 1480 may downsample the wide-angle image 1448 to produce a downsampled wide-angle image 1484 (e.g., a reduce-detail image). For example, the downsampler 1480 may remove a portion of image data (e.g., may retain only a portion or fraction of image data, pixels, etc.). The downsampled wide-angle image 1484 may be provided to the gradient-domain image blender 1486.

The gradient-domain image blender 1486 may perform gradient domain image blending based on the downsampled first composite image 1482 and the downsampled wide-angle image 1484. For example, the gradient-domain image blender 1486 may perform gradient-domain image blending in accordance with Equation (4). The gradient-domain image blender 1486 may produce a downsampled blended image 1488, which may be provided to the difference determiner 1490.

The difference determiner 1490 may determine a difference image 1492 based on the downsampled first composite image 1482 and the downsampled blended image 1488 (e.g., may subtract the images). The difference determiner 1490 may provide the difference image 1492 to the upsampler 1494.

The upsampler 1494 may upsample the difference image 1492. For example, the upsampler 1494 may add image data (e.g., pixel data) to the difference image 1492. In some configurations, the upsampler 1494 may insert duplicate values or other values to the difference image 1492. The upsampler 1494 may produce an upsampled difference image 1496, which may be provided to the adder 1498. In some approaches, upsampling may increase the size of the difference image to the same size as the first composite image 1460.

The adder 1498 may add detail to the upsampled difference image 1496. For example, the adder 1498 may add the first composite image 1460 to the upsampled difference image 1496. Adding the first composite image 1460 to the upsampled difference image 1496 may produce the second (e.g., final) composite image 1454. Performing image blending (e.g., gradient-domain image blending) on reduced-detail images may help to reduce processing complexity and/or processing delay. For example, performing image blending (e.g., gradient-domain image blending) on reduced-detail images may increase processing efficiency and/or speed.

Figure 15:
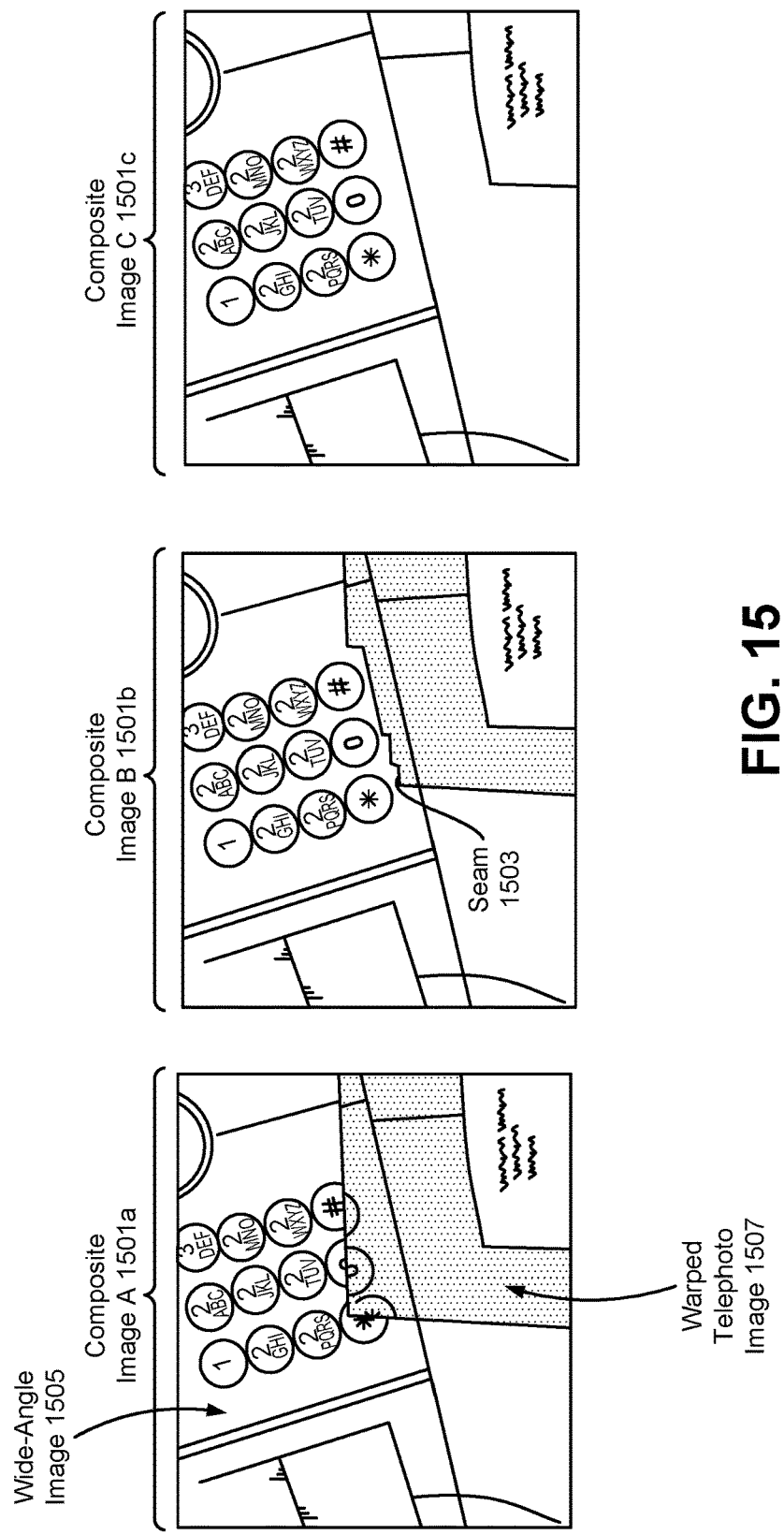
FIG. 15 is an example of compositing a wide-angle image and a telephoto image in accordance with the systems and methods disclosed herein.

FIG. 15 is an example of compositing a wide-angle image and a telephoto image in accordance with the systems and methods disclosed herein. In particular, FIG. 15 illustrates a directly pasted warped telephoto image 1507 onto a wide-angle image 1505 in a co-visible region in composite image A 1501*a*. As can be observed in composite image A 1501*a*, the boundary between the wide-angle image and the warped telephoto image is apparent due to misalignments on the telephone buttons and due to mismatched exposure and color.

In accordance with the systems and methods disclosed herein, a seam 1503 may be determined that may help to avoid apparent misalignments between images as illustrated by composite image B 1501*b*. In particular, composite image B 1501*b* illustrates pasting a warped telephoto image to a region surrounded by an improved seam 1503.

Composite image C 1501*c* illustrates an example of matching the color of the warped telephoto image to the color of the wide-angle image with gradient-domain image blending. As can be observed in composite image C 1501*c*, there is no apparent seam between the telephoto image and the wide-angle image. The telephoto image may also contribute more detail to the wide-angle image.

Figure 16:
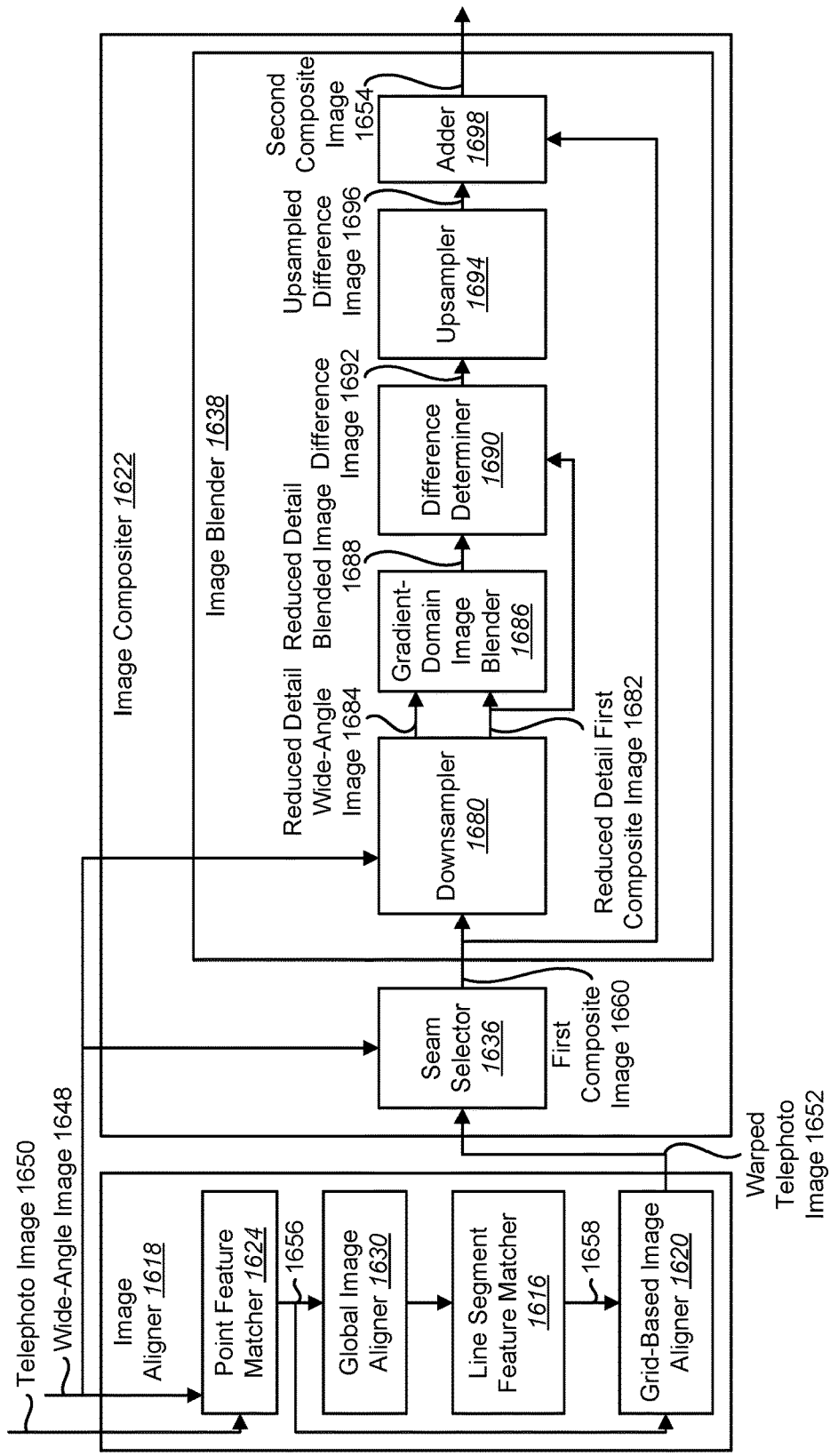
FIG. 16 is a block diagram illustrating a more specific example of an image aligner and an image compositer.

FIG. 16 is a block diagram illustrating a more specific example of an image aligner 1618 and an image compositer 1622. One or more of the elements, components, and/or algorithms illustrated in relation to FIG. 16 may be implemented in accordance with one or more corresponding components described in relation to one or more of FIGS. 1-15.

The image aligner 1618 may include a point feature matcher 1624, a global image aligner 1630, a line segment feature matcher 1616, and/or a grid-based image aligner 1620. A wide-angle image 1648 may be provided to the point feature matcher 1624, to a seam selector 1636, and/or to a downsampler 1680. A telephoto image 1650 may be provided to the point feature matcher 1624, which may produce a point feature correspondence 1656 based on the telephoto image 1650 and the wide-angle image 1648. The point feature correspondence 1656 may be provided to the global image aligner 1630 and the grid-based image aligner 1620.

The global image aligner 1630 may perform global image alignment (between the telephoto image 1650 and the wide-angle image 1648) based on the point feature correspondence 1656. The line segment feature matcher 1616 may produce line segment feature correspondence 1658 based on the global image alignment. The line segment feature correspondence 1658 may be provided to the grid-based image aligner 1620. The grid-based image aligner 1620 may produce a warped telephoto image 1652 based on the line segment feature correspondence 1658 and the point feature correspondence 1656.

The image compositer 1622 may include a seam selector 1636 and/or an image blender 1638. The image blender 1638 may include a downsampler 1680, a gradient-domain image blender 1686, a difference determiner 1690, an upsampler 1694, and an adder 1698.

The warped telephoto image 1652 may be provided to the seam selector 1636, which may perform seam selection and produce a first composite image 1660. The first composite image 1660 may be provided to the downsampler 1680. The downsampler 1680 may downsample the wide-angle image 1648 and the first composite image 1660 to produce a reduced detail wide-angle image 1684 and a reduced detail first composite image 1682, which may be provided to the gradient-domain image blender 1686. The reduced detail first composite image 1682 may also be provided to the difference determiner 1690.

The gradient-domain image blender 1686 may produce a reduced detail blended image 1688 based on the reduced detail wide-angle image 1684 and the reduced detail first composite image 1682. The reduced detail blended image may be provided to the difference determiner 1690. The difference determiner 1690 may produce a difference image 1692 based on the reduced detail blended image 1688 and the reduced detail first composite image 1682. The difference image 1692 may be provided to the upsampler 1694, which may produce an upsampled difference image 1696. The upsampled difference image 1696 may be provided to the adder 1698. The adder 1698 may produce a second composite image 1654 based on the upsampled difference image 1696 and the first composite image 1660.

Figure 17:
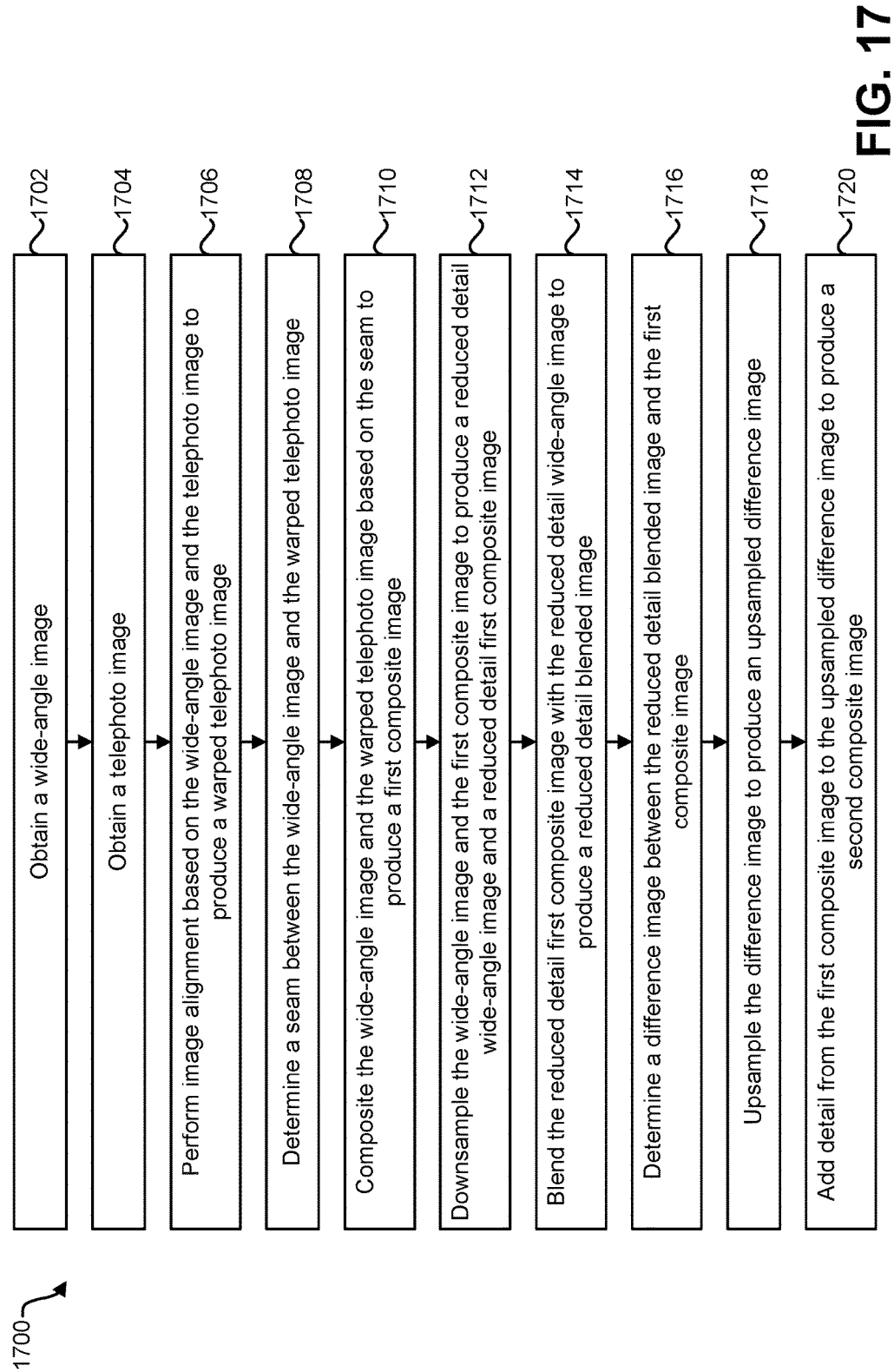
FIG. 17 is a flow diagram illustrating one configuration of a method for compositing a telephoto image and a wide-angle image.

FIG. 17 is a flow diagram illustrating one configuration of a method 1700 for compositing a telephoto image and a wide-angle image. One or more of the steps, procedures, functions, etc., described in relation to FIG. 17 may be performed as described in relation to one or more of FIGS. 1-16. For example, the method 1700 may be performed by the electronic device 102 described in relation to FIG. 1 and/or by one or more elements, components, and/or algorithms described in relation to FIG. 16.

The electronic device 102 may obtain 1702 a wide-angle image (e.g., one wide-angle image or a series of wide-angle images (e.g., wide-angle video)). The electronic device 102 may obtain 1704 a telephoto image (e.g., one telephoto image or a series of telephoto images (e.g., telephoto video)).

The electronic device 102 may perform 1706 image alignment based on the wide-angle image(s) and the telephoto image(s) to produce one or more warped telephoto images. The electronic device 102 may determine 1708 a seam between the wide-angle image and the warped telephoto image (e.g., between each pair of wide-angle and telephoto images).

The electronic device 102 may downsample 1712 the wide-angle image(s) and the first composite image(s) to produce a reduced detail wide-angle image and a reduced detail first composite image (e.g., a series of reduced detail wide-angle images and reduced detail first composite images). The electronic device 102 may blend 1714 the reduced detail first composite image(s) with the reduced detail wide-angle image(s) to produce one or more reduced detail blended images.

The electronic device 102 may determine 1716 a difference image between the reduced detail blended image and the first composite image (e.g., between each pair of reduced detail blended images and first composite images). The electronic device 102 may upsample 1718 the difference image(s) to produce one or more upsampled difference images. The electronic device 102 may add 1720 detail from the first composite image(s) to the upsampled difference image(s) to produce one or more second composite images.

Figure 18:
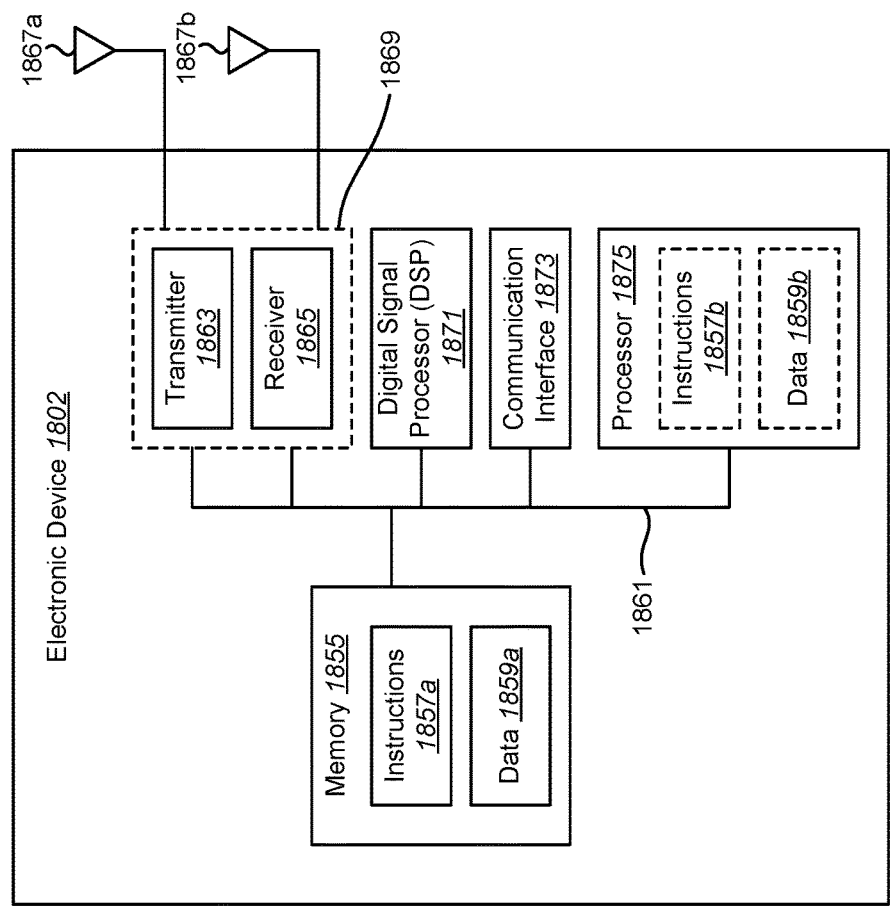
FIG. 18 illustrates certain components that may be included within an electronic device.

FIG. 18 illustrates certain components that may be included within an electronic device 1802. The electronic device 1802 may be an example of and/or may be implemented in accordance with the electronic device 102 described in relation to FIG. 1. The electronic device 1802 may be (or may be included within) a camera, video camcorder, digital camera, cellular phone, smart phone, computer (e.g., desktop computer, laptop computer, etc.), tablet device, media player, television, automobile, personal camera, action camera, surveillance camera, mounted camera, connected camera, robot, aircraft, drone, unmanned aerial vehicle (UAV), healthcare equipment, gaming console, personal digital assistants (PDA), set-top box, etc. The electronic device 1802 includes a processor 1875. The processor 1875 may be a general purpose single- or multi-chip microprocessor (e.g., an ARM), a special purpose microprocessor (e.g., a digital signal processor (DSP)), a microcontroller, a programmable gate array, etc. The processor 1875 may be referred to as a central processing unit (CPU). Although just a single processor 1875 is shown in the electronic device 1802, in an alternative configuration, a combination of processors (e.g., an ARM and DSP) could be used.

The electronic device 1802 also includes memory 1855. The memory 1855 may be any electronic component capable of storing electronic information. The memory 1855 may be embodied as random access memory (RAM), read-only memory (ROM), magnetic disk storage media, optical storage media, flash memory devices in RAM, on-board memory included with the processor, EPROM memory, EEPROM memory, registers, and so forth, including combinations thereof.

Data 1859a and instructions 1857a may be stored in the memory 1855. The instructions 1857a may be executable by the processor 1875 to implement one or more of the methods 200, 300, 400, 500, 1700 described herein. Executing the instructions 1857a may involve the use of the data 1859a that is stored in the memory 1855. When the processor 1875 executes the instructions 1857, various portions of the instructions 1857b may be loaded onto the processor 1875, and various pieces of data 1859b may be loaded onto the processor 1875.

The electronic device 1802 may also include a transmitter 1863 and a receiver 1865 to allow transmission and reception of signals to and from the electronic device 1802. The transmitter 1863 and receiver 1865 may be collectively referred to as a transceiver 1869. One or multiple antennas 1867a-b may be electrically coupled to the transceiver 1869. The electronic device 1802 may also include (not shown) multiple transmitters, multiple receivers, multiple transceivers and/or additional antennas.

The electronic device 1802 may include a digital signal processor (DSP) 1871. The electronic device 1802 may also include a communication interface 1873. The communication interface 1873 may enable one or more kinds of input and/or output. For example, the communication interface 1873 may include one or more ports and/or communication devices for linking other devices to the electronic device 1802. Additionally or alternatively, the communication interface 1873 may include one or more other interfaces (e.g., touchscreen, keypad, keyboard, microphone, camera, etc.). For example, the communication interface 1873 may enable a user to interact with the electronic device 1802.

The various components of the electronic device 1802 may be coupled together by one or more buses, which may include a power bus, a control signal bus, a status signal bus, a data bus, etc. For the sake of clarity, the various buses are illustrated in FIG. 18 as a bus system 1861.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing, and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may comprise a single computer-readable statement or many computer-readable statements.

The functions described herein may be implemented in software or firmware being executed by hardware. The functions may be stored as one or more instructions on a computer-readable medium. The terms "computer-readable medium" or "computer-program product" refers to any tangible storage medium that can be accessed by a computer or a processor. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk, and Blu-ray® disc where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed, or computed by the computing device or processor. As used herein, the term "code" may refer to software, instructions, code, or data that is/are executable by a computing device or processor.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio and microwave, then the coaxial cable, fiber optic cable, twisted pair, DSL, or wireless technologies such as infrared, radio and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

Further, it should be appreciated that modules and/or other appropriate means for performing the methods and techniques described herein, can be downloaded, and/or otherwise obtained by a device. For example, a device may be coupled to a server to facilitate the transfer of means for performing the methods described herein. Alternatively, various methods described herein can be provided via a storage means (e.g., random access memory (RAM), read-only memory (ROM), a physical storage medium such as a compact disc (CD) or floppy disk, etc.), such that a device may obtain the various methods upon coupling or providing the storage means to the device.

It is to be understood that the claims are not limited to the precise configuration and components illustrated above. Various modifications, changes, and variations may be made in the arrangement, operation, and details of the systems, methods, and apparatus described herein without departing from the scope of the claims.

What is claimed is:

1. A method for compositing images by an electronic device, comprising:
    obtaining a first composite image that is based on a first image from a first lens with a first focal length and a second image from a second lens with a different second focal length;
    downsampling the first composite image to produce a downsampled first composite image;
    downsampling the first image to produce a downsampled first image;
    producing a reduced detail blended image based on the downsampled first composite image and the downsampled first image;
    determining a difference between the reduced detail blended image and the downsampled first composite image to produce a difference image;
    producing an upsampled difference image by upsampling the difference image; and
    adding detail from the first composite image to the upsampled difference image to produce a second composite image.

2. The method of claim 1, wherein producing the reduced detail blended image comprises Poisson editing for color and intensity matching.

3. The method of claim 1, further comprising performing grid-based image alignment based on the first image and the second image to produce a warped second image.

4. The method of claim 3, wherein performing grid-based image alignment comprises minimizing re-projection errors of matched point features and matched line segment features while preserving rigidity.

5. The method of claim 1, further comprising:
    performing point feature matching based on the first image and the second image; and
    performing line segment feature matching based on the first image and the second image.

6. The method of claim 1, further comprising:
    determining at least one first image line segment feature and at least one second image line segment feature; and
    aligning the second image and the first image by matching the at least one second image line segment feature and the at least one first image line segment feature.

7. The method of claim 1, further comprising determining a seam based on the first image and the second image.

8. The method of claim 7, wherein determining the seam is based on a bias term that favors selecting second image data.

9. The method of claim 8, further comprising compositing the first image and a warped second image based on the seam to produce the first composite image.

10. An electronic device for compositing images, comprising:
    a memory;
    a processor coupled to the memory, wherein the processor is configured to:
    obtain a first composite image that is based on a first image from a first lens with a first focal length and a second image from a second lens with a different second focal length;
    downsample the first composite image to produce a downsampled first composite image;
    downsample the first image to produce a downsampled first image;
    produce a reduced detail blended image based on the downsampled first composite image and the downsampled first image;
    determine a difference between the reduced detail blended image and the downsampled first composite image to produce a difference image;
    produce an upsampled difference image by upsampling the difference image; and
    add detail from the first composite image to the upsampled difference image to produce a second composite image.

11. The electronic device of claim 10, wherein the processor is configured to produce the reduced detail blended image by performing Poisson editing for color and intensity matching.

12. The electronic device of claim 10, wherein the processor is configured to perform grid-based image alignment based on the first image and the second image to produce a warped second image.

13. The electronic device of claim 12, wherein the processor is configured to perform grid-based image alignment by minimizing re-projection errors of matched point features and matched line segment features while preserving rigidity.

14. The electronic device of claim 10, wherein the processor is configured to:
perform point feature matching based on the first image and the second image; and
perform line segment feature matching based on the first image and the second image.

15. The electronic device of claim 10, wherein the processor is configured to:
determine at least one first image line segment feature and at least one second image line segment feature; and
align the second image and the first image by matching the at least one second image line segment feature and the at least one first image line segment feature.

16. The electronic device of claim 10, wherein the processor is configured to determine a seam based on the first image and the second image.

17. The electronic device of claim 16, wherein the processor is configured to determine the seam based on a bias term that favors selecting second image data.

18. The electronic device of claim 17, wherein the processor is configured to composite the first image and a warped second image based on the seam to produce the first composite image.

19. A computer-program product for compositing images, comprising a non-transitory tangible computer-readable medium having instructions thereon, the instructions comprising:
code for causing an electronic device to obtain a first composite image that is based on a first image from a first lens with a first focal length and a second image from a second lens with a different second focal length;
code for causing the electronic device to downsample the first composite image to produce a downsampled first composite image;
code for causing the electronic device to downsample the first image to produce a downsampled first image;
code for causing the electronic device to produce a reduced detail blended image based on the downsampled first composite image and the downsampled first image;
code for causing the electronic device to determine a difference between the reduced detail blended image and the downsampled first composite image to produce a difference image;
code for causing the electronic device to produce an upsampled difference image by upsampling the difference image; and
code for causing the electronic device to add detail from the first composite image to the upsampled difference image to produce a second composite image.

20. The computer-program product of claim 19, the instructions further comprising code for causing the electronic device to perform grid-based image alignment based on the first image and the second image to produce a warped second image.

21. The computer-program product of claim 19, the instructions further comprising code for causing the electronic device to:
perform point feature matching based on the first image and the second image; and
perform line segment feature matching based on the first image and the second image.

22. The computer-program product of claim 19, the instructions further comprising code for causing the electronic device to determine a seam based on the first image and the second image.

23. An apparatus for compositing images, comprising:
means for obtaining a first composite image that is based on a first image from a first lens with a first focal length and a second image from a second lens with a different second focal length;
means for downsampling the first composite image to produce a downsampled first composite image;
means for downsampling the first image to produce a downsampled first image;
means for producing a reduced detail blended image based on the downsampled first composite image and the downsampled first image;
means for determining a difference between the reduced detail blended image and the downsampled first composite image to produce a difference image;
means for producing an upsampled difference image by upsampling the difference image; and
means for adding detail from the first composite image to the upsampled difference image to produce a second composite image.

24. The apparatus of claim 23, further comprising means for performing grid-based image alignment based on the first image and the second image to produce a warped second image.

25. The apparatus of claim 23, further comprising:
means for performing point feature matching based on the first image and the second image; and
means for performing line segment feature matching based on the first image and the second image.

26. The apparatus of claim 23, further comprising means for determining a seam based on the first image and the second image.

* * * * *